(12) United States Patent
Freisleben et al.

(10) Patent No.: US 12,308,904 B2
(45) Date of Patent: *May 20, 2025

(54) ENHANCED ANTENNA UTILIZATION

(71) Applicant: Qualcomm Incorporated, San Diego, CA (US)

(72) Inventors: Stefan Freisleben, Neubiberg (DE); Patric Heide, Vaterstetten (DE); Alexander Chernyakov, Munich (DE); Mykola Shevelov, Munich (DE); Wai San Wong, San Diego, CA (US); Oleksandr Gavryliuk, Neubiberg (DE); Petro Komakha, Santee, CA (US); Georgiy Sevskiy, Munich (DE); Steve Andre Beaudin, Fremont, CA (US); David Maldonado, San Marcos, CA (US)

(73) Assignee: QUALCOMM Incorporated, San Diego, CA (US)

(*) Notice: Subject to any disclaimer, the term of this patent is extended or adjusted under 35 U.S.C. 154(b) by 371 days.

This patent is subject to a terminal disclaimer.

(21) Appl. No.: 17/881,501

(22) Filed: Aug. 4, 2022

(65) Prior Publication Data

US 2022/0385337 A1 Dec. 1, 2022

Related U.S. Application Data

(63) Continuation of application No. 16/368,556, filed on Mar. 28, 2019, now Pat. No. 11,411,615.

(Continued)

(51) Int. Cl.
*H04B 7/0413* (2017.01)
*H04B 1/00* (2006.01)
(Continued)

(52) U.S. Cl.
CPC ......... *H04B 7/0413* (2013.01); *H04B 1/0057* (2013.01); *H04B 1/18* (2013.01); *H04B 1/40* (2013.01)

(58) Field of Classification Search
CPC ....... H04B 7/0413; H04B 1/0057; H04B 1/18
See application file for complete search history.

(56) References Cited

U.S. PATENT DOCUMENTS 7,583,936 B2   9/2009 Kovacs et al.
9,820,158 B2   11/2017 Chrisikos et al.
(Continued)

OTHER PUBLICATIONS

International Search Report and Written Opinion—PCT/US2019/024897—ISA/EPO—Aug. 13, 2019.

(Continued)

*Primary Examiner* — Won Tae C Kim
(74) *Attorney, Agent, or Firm* — Loza & Loza LLP

(57) ABSTRACT

In an example, an apparatus includes first and second antennas and a switched extractor coupled to the first antenna. The switched extractor includes an extractor configured to extract an extraction frequency band, a bypass line, and switching circuitry. The switching circuitry is configured to selectively establish a bypass signal path including the bypass line or a concurrent signal path including the extractor. The apparatus also includes first and second transceiver units (TRXUs) and a processor. The first TRXU is coupled to the first antenna via the switched extractor. The second TRXU is coupled to the first antenna via the switched extractor and coupled to the second antenna. The processor is configured to cause the switching circuitry to selectively connect the first TRXU to the first antenna via the bypass or the concurrent signal path based on the extraction frequency band and an operational frequency band associated with the first TRXU.

19 Claims, 22 Drawing Sheets

Related U.S. Application Data

(60) Provisional application No. 62/650,253, filed on Mar. 29, 2018.

(51) Int. Cl.
    *H04B 1/18*     (2006.01)
    *H04B 1/40*     (2015.01)

(56) References Cited

U.S. PATENT DOCUMENTS

| | | |
|---|---|---|
| 11,411,615 B2 | 8/2022 | Freisleben et al. |
| 2012/0009886 A1 | 1/2012 | Poulin |
| 2013/0225107 A1 | 8/2013 | Lane et al. |
| 2014/0241446 A1 | 8/2014 | Zhang et al. |
| 2015/0117281 A1 | 4/2015 | Khlat et al. |
| 2015/0124676 A1 | 5/2015 | Song et al. |
| 2015/0303973 A1 | 10/2015 | Wloczysiak |
| 2018/0048345 A1 | 2/2018 | Pehlke et al. |
| 2018/0152848 A1 | 5/2018 | Egner et al. |
| 2019/0044548 A1 | 2/2019 | Freisleben |

OTHER PUBLICATIONS

Partial International Search Report—PCT/US2019/024897—ISA/EPO—Jul. 19, 2019.

ENHANCED ANTENNA UTILIZATION

CROSS-REFERENCE TO RELATED APPLICATION(S)

This application claims priority to and is a continuation of U.S. patent application Ser. No. 16/368,556, titled "ENHANCED ANTENNA UTILIZATION" filed Mar. 28, 2019 which claims the benefit of U.S. Provisional Application No. 62/650,253, filed Mar. 29, 2018, the disclosure of which is hereby incorporated by reference in its entirety herein.

TECHNICAL FIELD

This disclosure relates generally to electronic communications and, more specifically, to enhancing antenna and path utilization through selective coupling of one or more antennas to one or more transceiver units using a switched extractor.

BACKGROUND

Electronic devices include traditional computing devices such as desktop computers, notebook computers, smartphones, wearable devices like a smartwatch, internet servers, and so forth. However, electronic devices also include other types of devices with computing power such as personal voice assistants, thermostats, automotive electronics, robotics, devices embedded in other machines like refrigerators and industrial tools, Internet-of-Things (IoT) devices, and the like. These various electronic devices provide information, entertainment, social interaction, security, safety, productivity, transportation, and other services to human users. Thus, electronic devices play crucial roles in many aspects of modern society.

Many of the services provided by electronic devices in today's interconnected world depend at least partly on electronic communications. Electronic communications can include those exchanged between or among distributed electronic devices using wireless or wired signals that are transmitted over one or more networks, such as the Internet or a cellular network. Wireless communications are made in accordance with many different wireless standards.

Thus, electronic devices are expected to be able to handle different types of wireless communications. However, different electronic devices are expected to meet different size, cost, power usage, or other constraints. Consequently, electrical engineers and other designers of electronic devices strive to enable electronic devices to handle wireless communications of different types while meeting specified constraints.

SUMMARY

Performing or enabling enhanced antenna and path utilization is disclosed herein. Generally, an electronic device has a finite number of antennas and internal communication paths due to size, costs, or complexity constraints. In example implementations, enhanced antenna utilization enables each given antenna of multiple antennas of an electronic device to be selectively utilized for a given band or for multiple concurrent bands. For instance, a switched extractor can be deployed between an antenna and multiple transceiver units of a wireless transceiver. The switched extractor includes an extractor, at least one bypass line, and switching circuitry. The extractor includes multiple filters and can produce multiple separated concurrent signals from an incoming joint concurrent signal for a receiving operation. For a transmitting operation, the extractor can produce an outgoing joint concurrent signal from multiple separate concurrent signals. In example operations, a switched extractor controller causes the switching circuitry of the switched extractor to selectively establish a bypass signal path via the bypass line (e.g., for one band) or a concurrent signal path via the extractor (e.g., for multiple simultaneous bands) for use with a given antenna to which the switched extractor is coupled. With multiple bypass lines, the switched extractor can provide multiple individual bypass signal paths for respective individual bands of individual transceiver units at different times using the given antenna.

In some implementations, by using the switched extractor, an electronic device can establish different multiple-input, multiple-output (MIMO) configurations for different communication types. Communication types include, for example, those for wireless wide area network (WWAN) (e.g., cellular) communications or wireless local area network (WLAN) (e.g., Wi-Fi) communications. In operation, if bands for different communication types are not proximate to one another, a switched extractor can establish a concurrent signal path to provide relatively higher levels of MIMO configurations for each communication type. In contrast, if bands for different communication types are proximate to each other (e.g., adjacent or at least partially overlapping in a currently-employed range of the bands), a switched extractor can establish a bypass signal path for one band or the other to prevent inadvertent signal attenuation from a filter of the extractor. To accommodate switching to a bypass signal path, the electronic device can reduce at least one MIMO configuration to establish a relatively lower level for the MIMO configuration (e.g., can decrease a quantity of antennas or signal layers of the MIMO configuration) for at least one communication type. The communication type designated for a decreased or lowered MIMO configuration can be selected based on signal quality, data priority, and so forth. In these manners, a finite quantity of antennas can be utilized with different transceiver units corresponding to different communication types to achieve a desired signal quality, bandwidth throughput, or MIMO configuration. Example implementations for enhanced antenna utilization are described with respect to apparatuses, arrangements, methods, and so forth.

In an example aspect, a wireless communications apparatus is disclosed. The wireless communications apparatus includes multiple antennas, a switched extractor, multiple transceiver units, and at least one processor. The multiple antennas include a first antenna and a second antenna. The switched extractor is coupled to the first antenna and includes an extractor, a bypass line, and switching circuitry. The extractor includes multiple filters and is configured to extract an extraction frequency band using the multiple filters. The switching circuitry is coupled to the extractor and the bypass line. The switching circuitry is configured to selectively establish a bypass signal path including the bypass line or a concurrent signal path including the extractor. The multiple transceiver units include a first transceiver unit and a second transceiver unit. The first transceiver unit is coupled to the first antenna via the switched extractor, and the second transceiver unit is coupled to the first antenna via the switched extractor and is also coupled to the second antenna. The at least one processor is coupled to the switching circuitry. The at least one processor is configured to cause the switching circuitry to selectively connect the first transceiver unit to the first antenna via the bypass signal path or via the concurrent signal path based on the extraction frequency band and an operational frequency band associated with the first transceiver unit.

In an example aspect, a wireless communications apparatus is disclosed. The wireless communications apparatus includes multiple antennas, a switched extractor, and multiple transceiver units. The multiple antennas include a first antenna and a second antenna. The switched extractor is coupled to the first antenna and includes an extractor and a bypass line. The extractor includes multiple filters and is configured to extract an extraction frequency band using the multiple filters. The switched extractor also includes switch means for selectively establishing across the switched extractor a bypass signal path including the bypass line or a concurrent signal path including the extractor. The multiple transceiver units include a first transceiver unit and a second transceiver unit. The first transceiver unit is coupled to the first antenna via the switched extractor, and the second transceiver unit is coupled to the first antenna via the switched extractor and is also coupled to the second antenna. The apparatus also includes processor means for causing the switch means to selectively connect the first transceiver unit to the first antenna via the bypass signal path or via the concurrent signal path based on the extraction frequency band and an operational frequency band associated with the first transceiver unit.

In an example aspect, a method for enhancing antenna utilization is disclosed. The method includes receiving a first wireless signal at a first antenna. The method also includes routing the first wireless signal from the first antenna along a concurrent signal path. The routing includes separating the first wireless signal into a first concurrent signal and a second concurrent signal in accordance with an extraction frequency band. The routing also includes providing the first concurrent signal to a first transceiver unit and providing the second concurrent signal to a second transceiver unit. The method additionally includes receiving a second wireless signal at a second antenna and providing the second wireless signal to the second transceiver unit. Also, the extraction frequency band is compared to an operational frequency band associated with the first transceiver unit. Responsive to the comparing, a command is issued to switch from the concurrent signal path to a bypass signal path. The method further includes, responsive to the issuing, routing the first wireless signal from the first antenna along the bypass signal path, with this routing including providing a version of the first wireless signal to the first transceiver unit.

In an example aspect, a wireless communications apparatus is disclosed. The wireless communications apparatus includes multiple antennas, a wireless transceiver, a network, and at least one processor. The multiple antennas include a first antenna, a second antenna, and a third antenna. The wireless transceiver includes a first transceiver unit and a second transceiver unit. The network couples the multiple antennas to the wireless transceiver and includes a switched extractor. The switched extractor includes an extractor, a first bypass line, a second bypass line, and switching circuitry. The switching circuitry is coupled to the extractor, the first bypass line, and the second bypass line. The switching circuitry is configured to selectively establish a concurrent signal path including the extractor, a first bypass signal path including the first bypass line, or a second bypass signal path including the second bypass line. The at least one processor is coupled to the network. The at least one processor is configured to cause the network to establish at a first time a first multiple-input, multiple-output (MIMO) configuration for a wireless wide area network (WWAN) communication. The first MIMO configuration includes a first connection and a fourth connection. The first connection, which extends between the first antenna and the first transceiver unit, includes the concurrent signal path of the extractor. The fourth connection, which extends between the third antenna and the first transceiver unit, omits the switched extractor. The at least one processor is configured to also cause the network to establish at the first time a second MIMO configuration for a wireless local area network (WLAN) communication. The second MIMO configuration includes a second connection and a third connection. The second connection, which extends between the first antenna and the second transceiver unit, includes the concurrent signal path of the extractor. The third connection, which extends between the second antenna and the second transceiver unit, omits the switched extractor.

BRIEF DESCRIPTION OF DRAWINGS

FIG. 2-1 illustrates an example switched extractor, which includes an extractor and a bypass line, coupled between an antenna and a wireless transceiver for enhanced antenna utilization.

FIG. 2-2 illustrates an example extractor that can be implemented as part of a switched extractor for enhanced antenna utilization.

FIG. 3-1 is a schematic diagram illustrating an example single switched extractor and an example double switched extractor, with each switched extractor having switching circuitry.

FIG. 3-2 is a schematic diagram illustrating another example single switched extractor and another example double switched extractor, with each switched extractor having switching circuitry.

FIG. 5-1 depicts a switched extractor as in FIG. 4 that illustrates an example concurrent signal path for a concurrency mode of the switched extractor.

FIG. 5-2 depicts a switched extractor as in FIG. 4 that illustrates an example bypass signal path for a bypass mode of the switched extractor.

FIGS. 8-1 and 8-2 illustrate example approaches to packaging and otherwise realizing a switched extractor as part of an electronic device.

FIG. 9-1 illustrates an example multi-antenna configuration in which a switched extractor is operated by an electronic device in a concurrency mode.

FIG. 9-2 illustrates another example multi-antenna configuration in which the switched extractor is operated by the electronic device in a first bypass mode.

FIG. 9-3 illustrates yet another example multi-antenna configuration in which the switched extractor is operated by the electronic device in a second bypass mode.

FIG. 10-1 illustrates an example implementation for a switched extractor controller for enhanced antenna utilization.

FIG. 10-2 is a table illustrating example configurations for a switched extractor and corresponding example communication resource scenarios.

FIG. 11-1 illustrates an example scheme for operating a processor to facilitate enhanced antenna utilization.

FIG. 11-2 is a flow chart illustrating an example approach implementing enhanced antenna utilization using the processor of FIG. 11-1.

DETAILED DESCRIPTION

Figure 1:
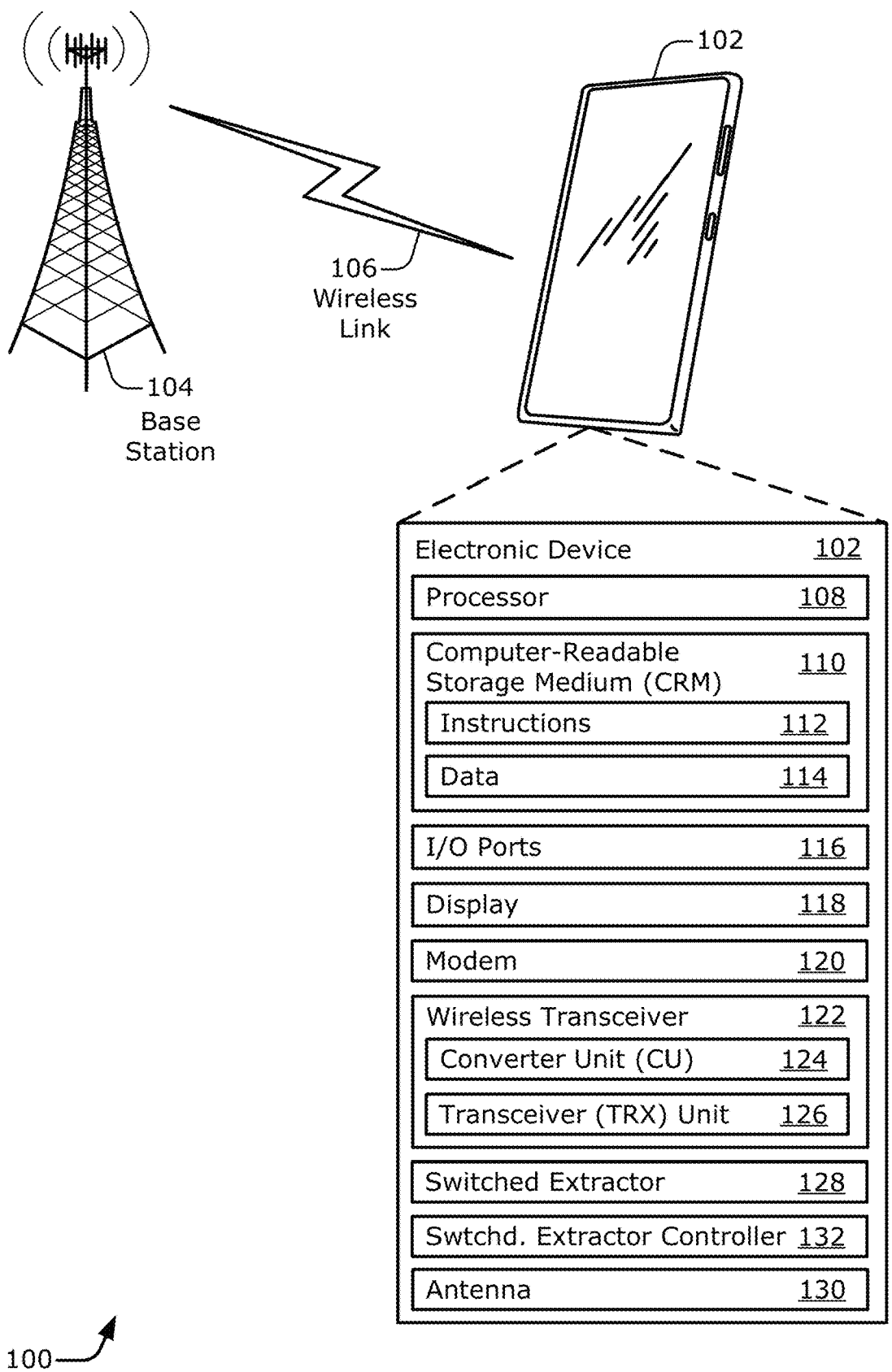
FIG. 1 illustrates an example environment that includes an electronic device in which a switched extractor can be implemented for enhanced antenna utilization.

Electronic devices are expected to be able to handle different types of wireless communications. However, electronic devices are also expected to meet certain size, cost, power usage, or other constraints. For example, due to cost and size constraints of, e.g., mobile electronic devices, a total number of available antennas as well as internal communication paths is likewise constrained. With existing approaches, a constrained number of antennas results in a quantity of concurrent bands also being constrained (e.g., directly or in terms of an available MIMO configuration for a given band) and/or results in the use of some bands adversely impacting the quality of other bands.

In contrast, performing or enabling enhanced antenna utilization is disclosed herein. In example implementations, an antenna of an electronic device can be selectively used to feed a signal to a single transceiver unit or to feed portions of the signal to multiple transceiver units concurrently. The electronic device includes a switched extractor, and the switched extractor includes an extractor, a bypass line, and switching circuitry. The extractor includes multiple filters to separate an incoming signal into different portions. From a frequency perspective, the different portions can be mutually exclusive after filtering by the extractor. For example, a frequency range that is passed by a bandpass filter may substantially comprise a same frequency range (e.g., with some overlap) that is rejected (e.g., suppressed) by a band-rejection filter. The bypass line can propagate an incoming signal without appreciably attenuating any desired frequency range or ranges of the incoming signal. However, the bypass line may include at least one filter (e.g., a lowpass filter or a high-pass filter). The switching circuitry includes at least a first switch and a second switch.

In an example receiving operation, the switching circuitry selectably routes a received signal across the switched extractor. For a concurrency mode, the switching circuitry routes the received signal from a port that is on an antenna side of the switched extractor to a first port and a second port of the switched extractor via the extractor thereof. The first port receives one filtered version corresponding to a first band of the received signal, and the second port receives another filtered version corresponding to a second band of the received signal. In this manner, one antenna can service two different bands. However, in some scenarios, the effects on the incoming signal by the extractor outweigh the concurrency advantages of the concurrency mode. For example, the insertion loss of the extractor or the proximity of the frequencies of the first and second bands may adversely impact an ability to recover the desired information from the received signal.

In such situations, a switched extractor controller instructs the switching circuitry to reconfigure the switched extractor into a bypass mode. For the bypass mode, the switching circuitry routes the received signal from the port on the antenna side of the switched extractor to the first port of the switched extractor via the bypass line. In this bypass mode, a transceiver unit coupled to the first port of the switched extractor can obtain the received signal as a version that is unaffected by the extractor. Although the preceding describes an example receiving operation, the switched extractor can also be employed in a transmitting operation. Example implementations with apparatuses, arrangements. and methods for enhanced antenna utilization are described herein.

FIG. 1 illustrates an example environment 100 that includes an electronic device 102 in which a switched extractor 128 can be implemented for enhanced antenna utilization. In the environment 100, the electronic device 102 communicates with a base station 104 through a wireless communication link 106 (wireless link 106). In this example, the electronic device 102 is depicted as a smart phone. However, the electronic device 102 may be implemented as any suitable computing or other electronic device, such as a cellular base station, broadband router, access point, cellular or mobile phone, gaming device, navigation device, media device, laptop computer, desktop computer, tablet computer, server, network-attached storage (NAS) device, smart appliance, vehicle-based communication system, Internet-of-Things (IoT) device, and so forth.

The base station 104 communicates with the electronic device 102 via the wireless link 106, which may be implemented as any suitable type of wireless link. Although depicted as a base station tower of a cellular radio network, the base station 104 may represent or be implemented as another device, such as a satellite, cable television head-end, terrestrial television broadcast tower, access point, peer-to-peer device, mesh network node, fiber optic line, another electronic device generally, and so forth. Hence, the electronic device 102 may communicate with the base station 104 or another device via a wired connection, a wireless connection, or a combination thereof.

The wireless link 106 can include a downlink of data or control information communicated from the base station 104 to the electronic device 102 and an uplink of other data or control information communicated from the electronic device 102 to the base station 104. The wireless link 106 may be implemented using any suitable communication protocol or standard, such as 3rd Generation Partnership Project Long-Term Evolution (3GPP LTE), IEEE 802.11, IEEE 802.16, Bluetooth™, and so forth.

The electronic device 102 includes a processor 108 and a computer-readable storage medium 110 (CRM 110). The processor 108 may include any type of processor, such as an application processor or a multi-core processor, that is configured to execute processor-executable instructions (e.g., code) stored by the CRM 110. The CRM 110 may include any suitable type of data storage media, such as volatile memory (e.g., random access memory (RAM)), non-volatile memory (e.g., Flash memory), optical media, magnetic media (e.g., disk or tape), and so forth. In the context of this disclosure, the CRM 110 is implemented to store instructions 112, data 114, and other information of the electronic device 102, and thus does not include transitory propagating signals or carrier waves.

The electronic device 102 may also include input/output ports 116 (I/O ports 116) or a display 118. The I/O ports 116 enable data exchanges or interaction with other devices, networks, or users. The I/O ports 116 may include serial ports (e.g., universal serial bus (USB) ports), parallel ports, audio ports, infrared (IR) ports, and so forth. The display 118 can be realized as a screen or projection that presents graphics, e.g.—one or more graphical images, of the electronic device 102, such as for a user interface associated with an operating system, program, or application. Alternatively or additionally, the display 118 may be implemented as a display port or virtual interface through which graphical content of the electronic device 102 is communicated or presented.

For communication purposes, the electronic device 102 also includes a modem 120, a wireless transceiver 122, a switched extractor 128, a switched extractor controller 132, and an antenna 130. The wireless transceiver 122 provides connectivity to respective networks and other electronic devices connected therewith using radio-frequency (RF) wireless signals. Additionally or alternatively, the electronic device 102 may include a wired transceiver, such as an Ethernet or fiber optic interface for communicating over a personal or local network, an intranet, or the Internet. The wireless transceiver 122 may facilitate communication over any suitable type of wireless network, such as a wireless local area network (LAN) (WLAN), a peer-to-peer (P2P) network, a mesh network, a cellular network, a wireless wide-area-network (WWAN), a navigational network (e.g., the Global Positioning System (GPS) of North America or another Satellite Positioning System (SPS)), and/or a wireless personal-area-network (WPAN). In the context of the example environment 100, the wireless transceiver 122 enables the electronic device 102 to communicate with the base station 104 and networks connected therewith. Other figures referenced herein may pertain to other wireless networks.

The modem 120, such as a baseband modem, may be implemented as a system on-chip (SoC) that provides a digital communication interface for data, voice, messaging, and other applications of the electronic device 102. The modem 120 may also include baseband circuitry to perform high-rate sampling processes that can include analog-to-digital conversion (ADC), digital-to-analog conversion (DAC), gain correction, skew correction, frequency translation, and so forth. The modem 120 may also include logic to perform in-phase/quadrature (I/Q) operations, such as synthesis, encoding, modulation, demodulation, and decoding. More generally, the modem 120 may be realized as a digital signal processor (DSP) or a processor that is configured to perform signal processing to support communications via one or more networks. Alternatively, ADC or DAC operations may be performed by a separate component or another illustrated component, such as the wireless transceiver 122.

The wireless transceiver 122 can include circuitry, logic, and other hardware for transmitting or receiving a wireless signal for at least one communication frequency band. In operation, the wireless transceiver 122 can implement at least one, e.g., radio-frequency transceiver unit to process data and/or signals associated with communicating data of the electronic device 102 via the antenna 130. Generally, the wireless transceiver 122 can include filters, switches, amplifiers, and so forth for routing and conditioning signals that are transmitted or received via the antenna 130. As shown, the wireless transceiver 122 includes at least one converter unit 124 (e.g., for ADC or DAC operations) and at least one transceiver (TRX) unit 126.

Figures 1, 2:
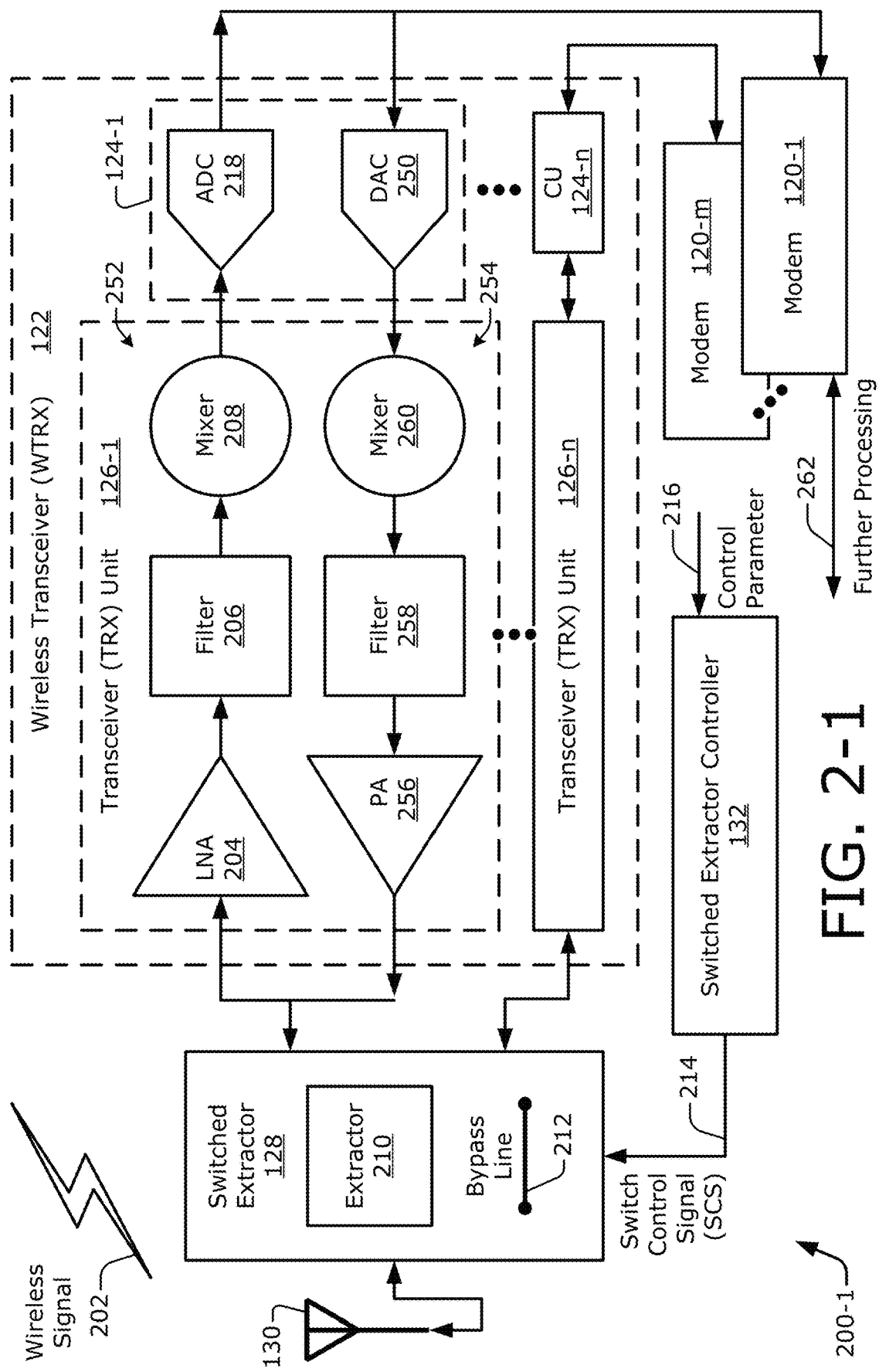
Figure 2:
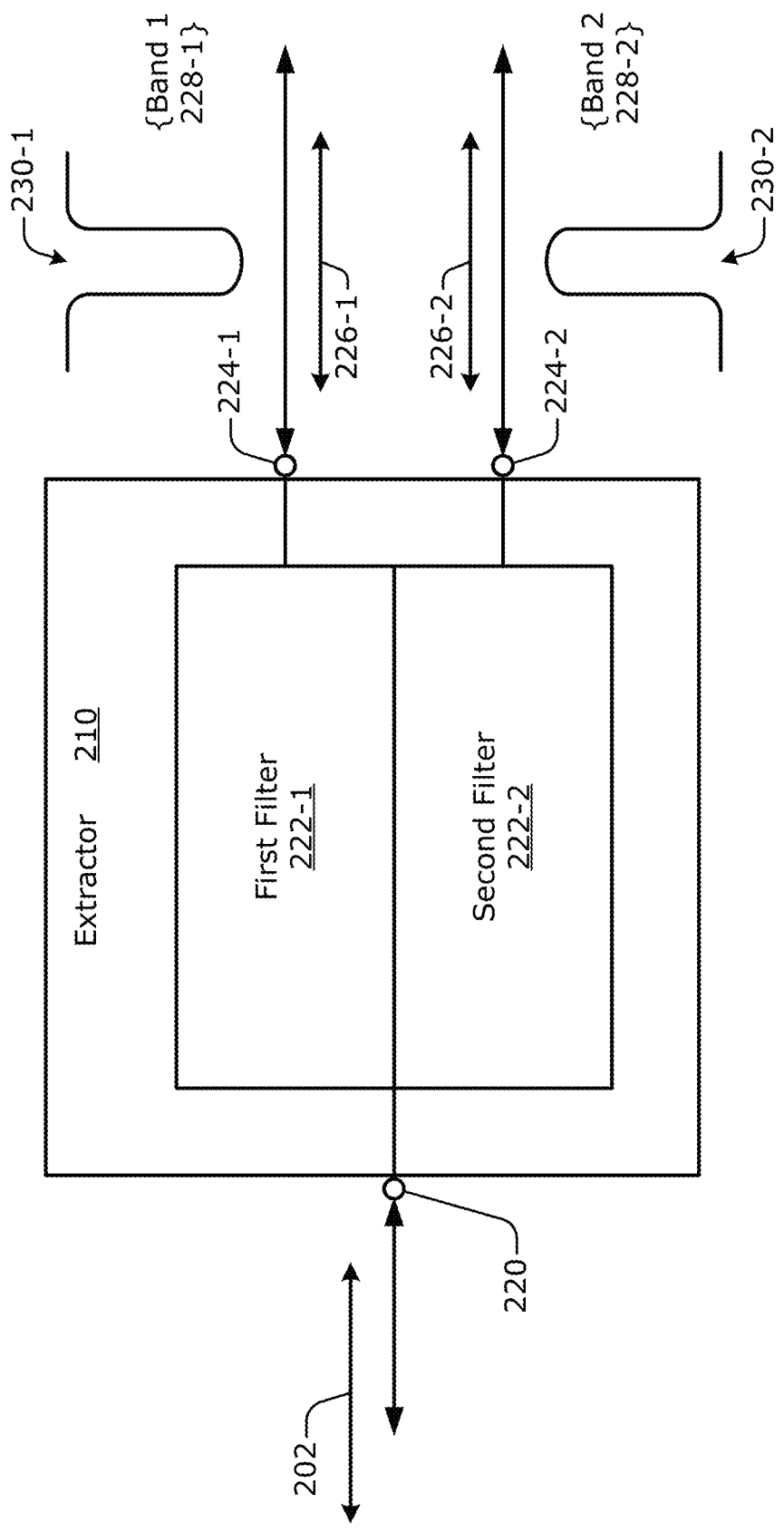

In some cases, components of the wireless transceiver 122, or a transceiver unit 126 thereof, are implemented as separate receiver and transmitter entities. Additionally or alternatively, the wireless transceiver 122 can be realized using multiple or different sections to implement respective receiving and transmitting operations (e.g., using separate transmit and receive chains). Example implementations of a transceiver unit 126 are described below with reference to FIG. 2-1. Further, example implementations of a switched extractor 128 and a switched extractor controller 132, including interactions with the wireless transceiver 122 and the modem 120, are shown in FIG. 2-1 and described herein. The switched extractor 128 can operate to at least partially implement enhanced antenna utilization as described herein.

FIG. 2-1 illustrates generally at 200-1 an example switched extractor 128 coupled between an antenna 130 and a wireless transceiver 122 for enhanced antenna utilization. The example switched extractor 128 includes at least one extractor 210 and at least one bypass line 212. From left to right, the antenna 130 is coupled to the switched extractor 128, and the switched extractor 128 is coupled to the wireless transceiver 122. The wireless transceiver 122 is coupled to one or more of multiple modems 120-1 . . . 120-$m$, with "m" representing a positive integer. The wireless transceiver 122 includes one or more transceiver units 126-1 . . . 126-$n$, with "n" representing a positive integer.

Thus, in FIG. 2-1, multiple transceiver units 126-1 to 126-$n$ are shown. As part of the wireless transceiver 122, each transceiver unit 126-1 to 126-$n$ is respectively coupled to an associated converter unit (CU) 124-1 to 124-$n$. Each converter unit 124, as depicted at the converter unit 124-1, can include an analog-to-digital converter (ADC) 218 or a digital-to-analog converter (DAC) 250. As shown, the transceiver unit 126-1 is coupled to the modem 120-1 (e.g., via the converter unit 124-1), and the transceiver unit 126-$n$ is coupled to the modem 120-$m$. However, multiple transceiver units 126 can be coupled to a same modem 120. Although only certain components are explicitly depicted in FIG. 2-1, the wireless transceiver 122 may include other non-illustrated components. Further, the converter units 124-1 to 124-$n$ may be separate from the wireless transceiver 122, such as by being part of a modem 120.

The transceiver unit 126-1 includes a receiver 252 (or receive chain) and a transmitter 254 (or transmit chain). The receiver 252 includes a low-noise amplifier 204 (LNA 204), a filter 206, and a mixer 208 for frequency down-conversion. The transmitter 254 includes a power amplifier 256 (PA 256), a filter 258, and a mixer 260 for up-conversion. However, the transceiver unit 126-1 can include other components, such as additional amplifiers or multiple mixers, that are disposed anywhere along the depicted receive and transmit chains. These example components can at least partially implement a radio-frequency front-end (RFFE) for the associated electronic device 102. The receiver 252 is coupled between the switched extractor 128 and the ADC 218, e.g., via the low-noise amplifier 204 and the mixer 208, respectively. The transmitter 254 is coupled between the switched extractor 128 and the DAC 250, e.g., via the power amplifier 256 and the mixer 260, respectively.

Thus, as shown for the receiver 252 of the transceiver unit 126-1, the switched extractor 128 is coupled to the low-noise amplifier 204, and the low-noise amplifier 204 is coupled to the filter 206. The filter 206 is coupled to the mixer 208, and the mixer 208 is coupled to the ADC 218. The ADC 218 is coupled to, or is part of, the modem 120-1. The switched extractor 128 is also coupled to the transceiver unit 126-$n$. An example signal-receiving operation that includes the receiver 252 of the transceiver unit 126-1 and the switched extractor 128 is described below. In some implementations, different transceiver units are associated with different wireless communication technologies, such as WWAN or WLAN. Additionally or alternatively, different transceiver units may provide parallel processing capabilities for a same wireless communication technology.

As part of the signal-receiving operation, the antenna 130 receives a wireless signal 202. The antenna 130 can be implemented as a diversity antenna. The antenna 130 provides the wireless signal 202 to the switched extractor 128. The switched extractor 128 accepts the wireless signal 202 from the antenna 130 and provides a version thereof to at least one selected transceiver unit 126. The selection of the transceiver unit(s) 126 is performed under the control of the switched extractor controller 132, as is described below. Here, the switched extractor 128 provides a version of the wireless signal 202 to at least the low-noise amplifier 204 of the transceiver unit 126-1. The low-noise amplifier 204 amplifies the signal version to produce an amplified signal. The low-noise amplifier 204 provides the amplified signal to the filter 206. The filter 206 filters (e.g., low-pass filters or bandpass filters) the amplified signal by attenuating some range or ranges of frequencies to produce a filtered signal that has one or more frequency bands attenuated. The filter 206 provides the filtered signal to the mixer 208.

The mixer 208 performs a frequency conversion operation on the filtered signal to down-convert from one frequency to a lower frequency, such as from a radio frequency (RF) to an intermediate frequency (IF) or a baseband frequency (BBF). The mixer 208 can perform the frequency down-conversion in a single conversion step, or through multiple conversion steps. Thus, the mixer 208 performs a frequency down-conversion operation on the filtered signal to produce a down-converted signal and provides the down-converted signal to the ADC 218. The ADC 218 converts the analog down-converted signal to a digital signal. The ADC 218 provides the digital signal to the modem 120-1. The modem 120-1 can perform demodulation, decoding, and so forth on the digital signal to produce a data signal. The modem 120-1 then provides the data signal to other components (not shown in FIG. 2-1), such as a device processor, for further processing, e.g., at an application level, as indicated at 262. Although operation of the switched extractor 128 with respect to surrounding components is described above in terms of an example receive operation, the switched extractor 128 can be utilized for signals flowing in the opposite direction for transmission operations using the transmitter 254.

As shown, the switched extractor controller 132 is implemented separately from the other illustrated components. However, the switched extractor controller 132 may be implemented in an alternative manner. For example, the switched extractor controller 132 can be realized as part of at least one modem 120, by the wireless transceiver 122, by another physical component such as a concurrency manager, by an air interface module, by an operating system executing on the corresponding electronic device 102, and so forth. Alternatively, the switched extractor controller 132 can be distributed across two or more different components, modules, and the like, such as across multiple modems 120.

The switched extractor controller 132 generates at least one switch control signal 214 (SCS) based on at least one control parameter 216, or command. A modem 120 or another processing component can provide one or more control parameters 216 to the switched extractor controller 132. The switched extractor controller 132 provides the switch control signal 214 (e.g., one signal, multiple signals, multiple signals over time, or multiple signals distributed over one or more signal lines simultaneously, or combinations thereof) to the switched extractor 128 to control whether a signal that is transiting across the switched extractor 128 propagates over the extractor 210 or the bypass line 212. The switched extractor controller 132 is configured to control the switched extractor 128 to enhance antenna and signal path utilization, as described herein. In some implementations, communication between the switched extractor controller 132 and the switched extractor 128 is performed in accordance with a switch control interface, such as the Mobile Industry Processor Interface (MIPI) standard or the General-Purpose Input/Output (GPIO) standard.

Under the control of the switched extractor controller 132, for a signal-receiving operation, the switched extractor 128 can forward a version of the wireless signal 202 to one or more selected transceiver units 126-1 or 126-n. For example, the switched extractor 128 can forward an unchanged version of the wireless signal 202 to the transceiver unit 126-1 using the bypass line 212. Alternatively, the switched extractor 128 can forward one filtered version of the wireless signal 202 to the transceiver unit 126-1 and another filtered version of the wireless signal 202 to the transceiver unit 126-n using the extractor 210. To do so, the switched extractor 128 can selectively employ the extractor 210 using switches that are controlled by the switched extractor controller 132 with the switch control signal 214. An example extractor 210 is described with reference to FIG. 2-2. Although control of the switched extractor 128 by the switched extractor controller 132 is described above in terms of an example receive operation, the switched extractor controller 132 can also control the switched extractor 128 for signals flowing in the opposite direction for transmission operations.

FIG. 2-2 illustrates generally at 200-2 an example extractor 210 that can be implemented as part of a switched extractor 128 (of FIG. 2-1) for enhanced antenna utilization. As shown, the extractor 210 includes at least one port on an antenna side of the switched extractor 128 (on the left as depicted) and one or more ports on a TRX side of the switched extractor 128 (on the right as depicted). The at least one antenna-side port is indicated as a port 220. Multiple TRX-side ports are indicated as a first port 224-1 and a second port 224-2. The extractor 210 also includes multiple filters: a first filter 222-1 and a second filter 222-2. Although two TRX-side ports and two filters are included for the extractor 210 of FIG. 2-2, an extractor 210 can have more ports or filters, e.g., as described below with reference to FIGS. 3-1 and 3-2.

Each respective filter 222 performs a filtering operation with respect to one or more frequency ranges. For example, a filter 222 can suppress or reject a particular frequency portion from a frequency range, or a filter 222 can pass a particular frequency portion of a frequency range while blocking other parts of the frequency range. For the extractor 210, the rejected frequency portion of one filter 222 can substantially comprise the passed frequency portion of the other filter 222, wherein some overlap may be permitted. Generally, the extractor 210 can separate a total frequency range into an extracted frequency range and a remaining frequency range that are complementary with respect to each other.

In an example signal-receiving operation, the extractor 210 accepts a wireless signal 202 at the port 220. The extractor 210 applies the wireless signal 202 to each included filter, both the first filter 222-1 and the second filter 222-2 here. The first filter 222-1 performs a first filtering operation in accordance with a first band 228-1 ("Band 1") to produce a first signal 226-1. Here, the first band 228-1 may comprise an interrupted band that spans a range of frequencies from a lower frequency to an upper frequency, except for those frequencies in an interrupted range. Further description of an interrupted band is provided below with reference to the two frequency responses 230-1 and 230-2. The extractor 210 outputs the first signal 226-1 via the first port 224-1. The second filter 222-2 performs a second filtering operation in accordance with a second band 228-2 ("Band 2") to produce a second signal 226-2. The extractor 210 outputs the second signal 226-2 via the second port 224-2. In an example signal-transmitting operation, the extractor 210 accepts first and second signals 226-1 and 226-2 at the first and second nodes 224-1 and 224-2, respectively. After filtering, the extractor 210 provides the wireless signal 202 at the node 220 for forwarding to the antenna 130.

As illustrated, the first filtering operation performs a band-rejection filtering operation as indicated by the band-rejection frequency response 230-1, and the second filtering operation performs a bandpass filtering operation as indicated by the bandpass frequency response 230-2. In this example, the frequency portion that is targeted by the band-rejection frequency range is approximately equivalent to (e.g., at least substantially overlapping) the frequency portion targeted by the bandpass frequency range (e.g., the extracted frequency range). Thus, the extractor 210 separates the wireless signal 202 into first and second signals 226-1 and 226-2 that have complementary frequency ranges relative to an extraction frequency band. This is accomplished by extracting a frequency range and forwarding the extracted frequency range in one of the signals at port 224 and forwarding the other existing or remaining frequencies from the wireless signal 202 in another one of the signals at another port 224. Thus, this extracted frequency range can correspond to an interrupted frequency range of the other signal.

As shown, the first filter 222-1 produces the band-rejection frequency response 230-1 corresponding to the first band 228-1. With a notch or rejected-frequency range extracted from the resulting band-rejection frequency response 230-1 of the first band 228-1, the first band 228-1 comprises an interrupted band as described above. The first band 228-1 may alternatively be considered as two frequency bands separated by another band, such as the second band 228-2 that corresponds to the extracted frequency range. In such a case, the two frequency bands each have a respective upper and lower frequency, with the upper frequency of one band and the lower frequency of the other band corresponding to a notched band. Thus, the first filter 222-1 and the second filter 222-2 can operate in concert to extract an interrupted band and a notched band, with the notched band (e.g., the second band 228-2) corresponding to the extracted range of frequencies and the interrupted band (e.g., the first band 228-1) comprising two bands separated by the notched band. Either or both of the interrupted band and the notched band can therefore be considered to comprise an extraction frequency band of the extractor 210. The first filter 222-1 or the second filter 222-2 can be implemented with or using at least one electro-acoustic component. Examples of electro-acoustic components include surface acoustic wave (SAW) filter components, bulk acoustic wave (BAW) filter components, guided bulk acoustic wave (GBAW) filter components, and so forth.

In an alternative implementation, a circuit for the extractor 210 includes a first signal path, a second signal path, and an antenna connection. The first signal path (e.g., a path at least from the port 220 to the first port 224-1) includes a bandpass filter (e.g., the first filter 222-1) having a frequency pass range. The second signal path (e.g., a path at least from the port 220 to the second port 224-2) includes a band-rejection filter (e.g., the second filter 222-2) having a frequency stop region. The antenna connection (e.g., at or proximate to the antenna 130 of FIG. 2-1) is connected to the circuit directly or via another circuit (e.g., at the port 220). The first and second signal paths are parallel to each other and are interconnected at a point between the antenna connection and the band pass filter and the band-rejection filter. Further, the frequency pass range can overlap the frequency stop region at least partly on one or both sides. The first and the second signal paths may also always be available to propagate data.

In some implementations, the bands 228 correspond to different frequency ranges, different radio-frequency technologies, different wireless standards, or some combination thereof. For example, the first band 228-1 can correspond to cellular technology (WWAN) or a 5G/LTE 3GPPP standard. The second band 228-2 can correspond to Wi-Fi technology (WLAN) or an IEEE 802.11 standard. Alternatively, the second band 228-2 can correspond to satellite-based positioning technology or a GPS/SPS standard. Further, the first band 228-1 can correspond, for instance, to a particular band (e.g., "band 40") of the LTE 3GPPP standard.

Thus, the extractor 210 enables an antenna 130 (e.g., of FIG. 2-1) to be shared by two different bands 228, each of which can be associated with a respective transceiver unit 126 or modem 120. The extractor 210 can alternatively include three or more filters 222. For example, with three filters 222, two passbands can be accommodated with two of the three filters while the third filter employs two band-rejection filters to pass the remaining frequencies. This is described further with reference to FIGS. 3-1 and 3-2.

Figures 1, 3:
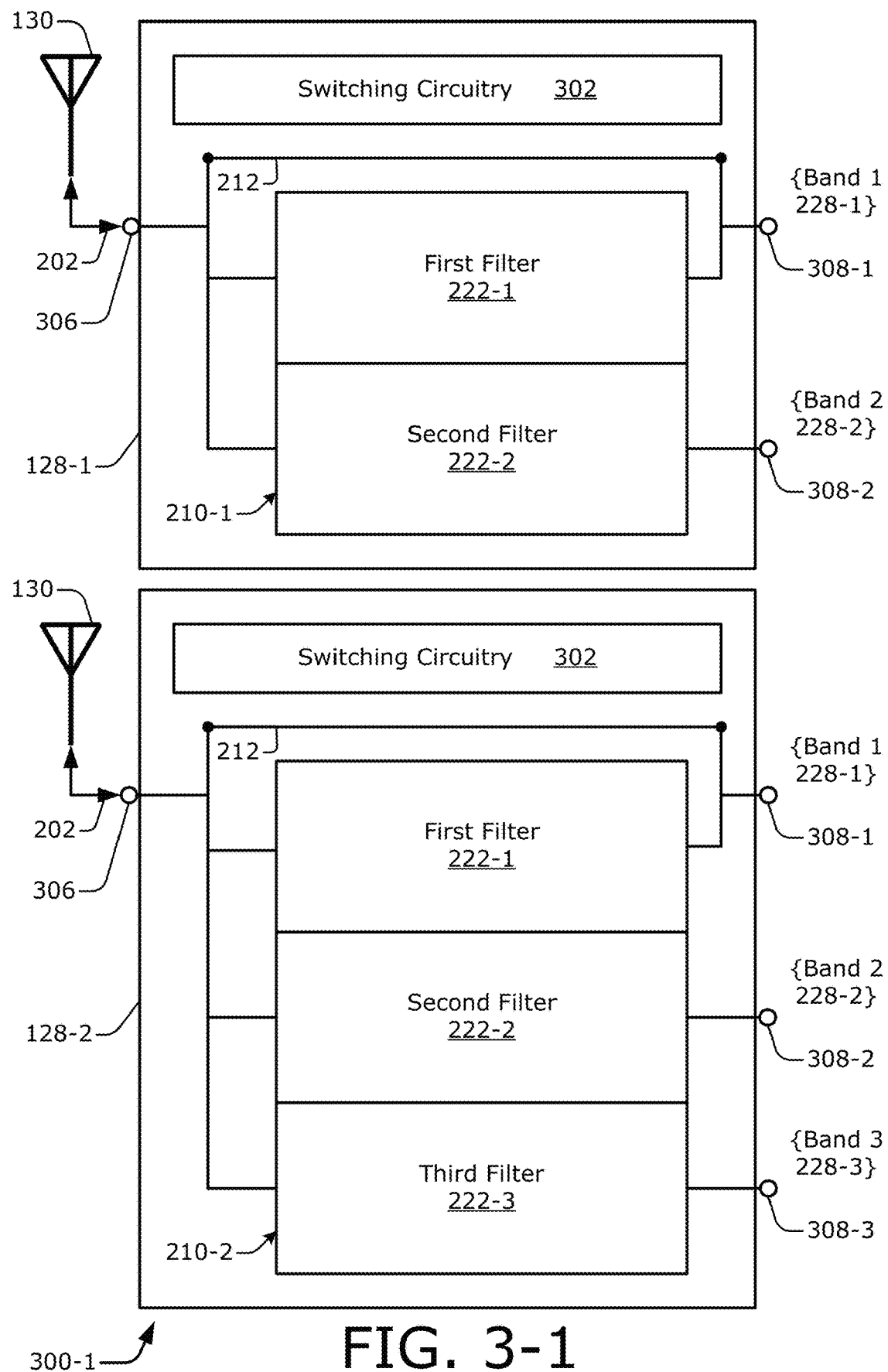
Figures 2, 3:
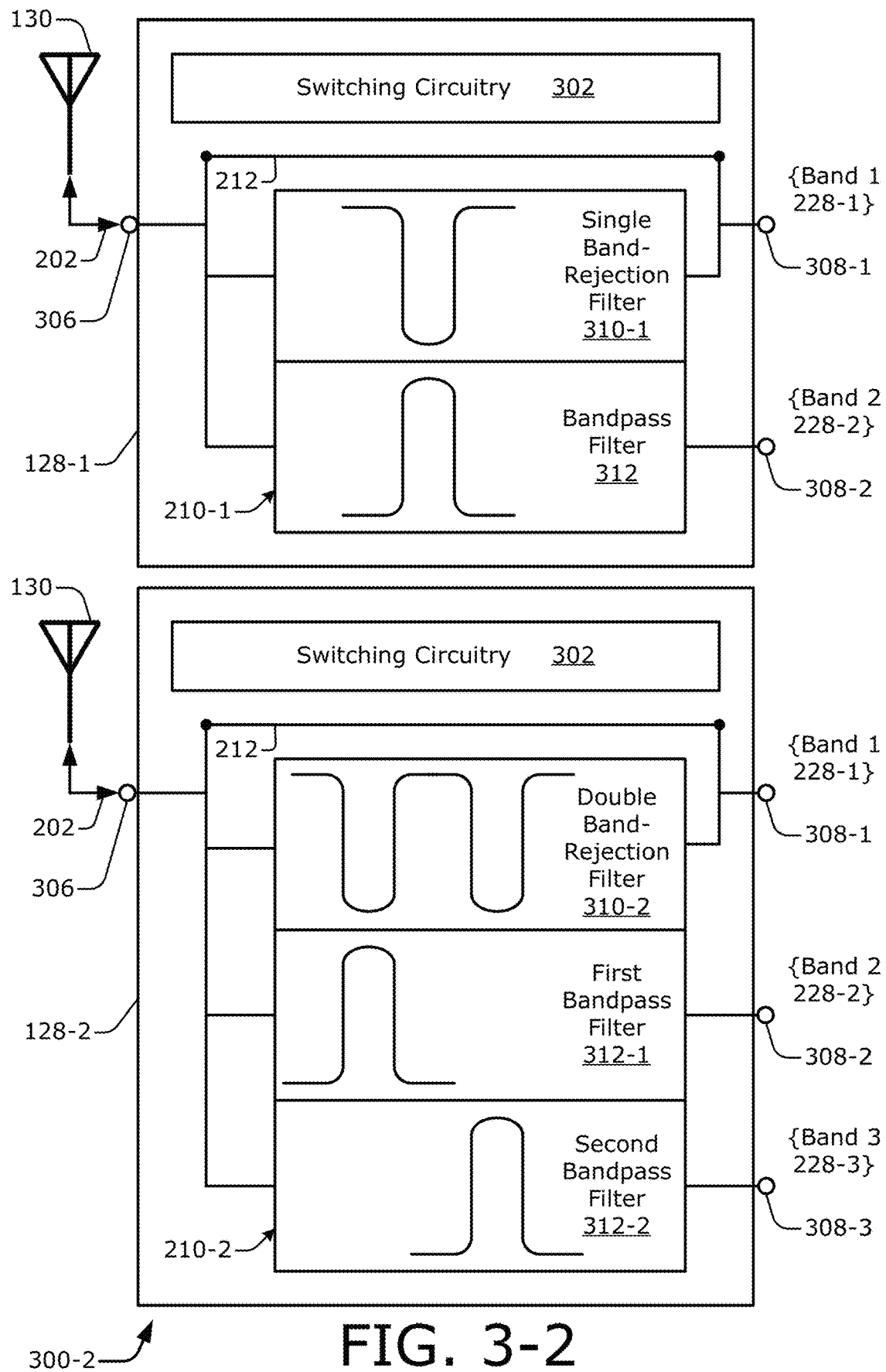

FIG. 3-1 is a schematic diagram 300-1 illustrating an example single switched extractor 128-1 and an example double switched extractor 128-2, with each switched extractor 128 including switching circuitry 302. The single switched extractor 128-1 includes a single extractor 210-1, and the double switched extractor 128-2 includes a double extractor 210-2. Each switched extractor 128 includes at least one antenna-side port 306 and multiple TRX-side ports: a first port 308-1 and a second port 308-2. Each extractor 210 of each switched extractor 128 also includes multiple filters: the first filter 222-1 and the second filter 222-2. The double switched extractor 128-2 further includes a third port 308-3 and a third filter 222-3 as part of the double extractor 210-2. More generally, a switched extractor 128 may be realized as a multiple switched extractor 128 (e.g., a double switched extractor 128-2, a triple switched extractor 128, a quadruple switched extractor 128, etc.), and an extractor 210 may be realized as a multiple extractor 210 (e.g., a double extractor 210-2, a triple extractor 210, a quadruple extractor 210, etc.).

Each switched extractor 128 also includes a bypass line 212. Although not shown, the bypass line 212 may include at least one filter or other signal-conditioning components between the port 306 and the first port 308-1. In some implementations, the bypass line 212 may have a lower or otherwise different insertion loss for certain signals or frequencies as compared to that of the extractor 210. In other implementations, the at least one filter of the bypass line 212 may employ a wider or otherwise more flexible transition band (e.g., filter skirt) than that of the extractor 210. In an example operation, the switching circuitry 302 causes the input wireless signal 202 to travel over the bypass line 212 or through the extractor 210. This switching is controlled by the switched extractor controller 132 (of FIG. 2-1) to enhance antenna utilization as described herein. Each respective first, second, and third port 308-1, 308-2, and 308-3 corresponds to a respective first, second, and third band 228-1, 228-2, and 228-3. Examples of these bands 228 are set forth below with reference to FIG. 3-2.

FIG. 3-2 is a schematic diagram 300-2 illustrating another example single switched extractor 128-1 and another example double switched extractor 128-2, with each switched extractor 128 including the switching circuitry 302. In an example implementation for the single extractor 210-1 of the single switched extractor 128-1, the first filter 222-1 and the second filter 222-2 (as indicated in FIG. 3-1) comprise a single band-rejection filter 310-1 and a bandpass filter 312, respectively. For the single band-rejection filter 310-1, the rejected range of frequencies comprises an extraction frequency band for the single switched extractor 128-1. For the bandpass filter 312, the passed range of frequencies comprises the extraction frequency band for the single switched extractor 128-1.

In an example implementation for the double extractor 210-2 of the double switched extractor 128-2, the first filter 222-1, the second filter 222-2, and the third filter 222-3 (as indicated in FIG. 3-1) comprise a double band-rejection filter 310-2, a first bandpass filter 312-1, and a second bandpass filter 312-2, respectively. Here, the double extractor 210-2 of the double switched extractor 128-2 includes two extraction frequency bands. Each filter pertains to at least one extraction frequency band, with the double band-rejection filter 310-2 corresponding to two different extraction frequency bands as shown. The second band 228-2 can correspond to a WLAN technology, and the first bandpass filter 312-1 can be centered around approximately 2450 megahertz (MHz) (e.g., for the 2.4 GHz Wi-Fi band). The third band 228-3 can correspond to a GPS technology, and the second bandpass filter 312-2 can be centered around approximately 1575 megahertz (MHz). Thus, the first band 228-1 can correspond to a cellular technology, and the double band-rejection filter 310-2 can extract and reject frequency ranges centered around approximately 1575 MHz and 2450 MHz and pass the remaining frequencies. More generally, a band-rejection filter 310 may be realized as a multiple band-rejection filter 310 (e.g., a double band-rejection filter 310-2, a triple band-rejection filter 310, a quadruple band-rejection filter 310, etc.).

Figure 4:
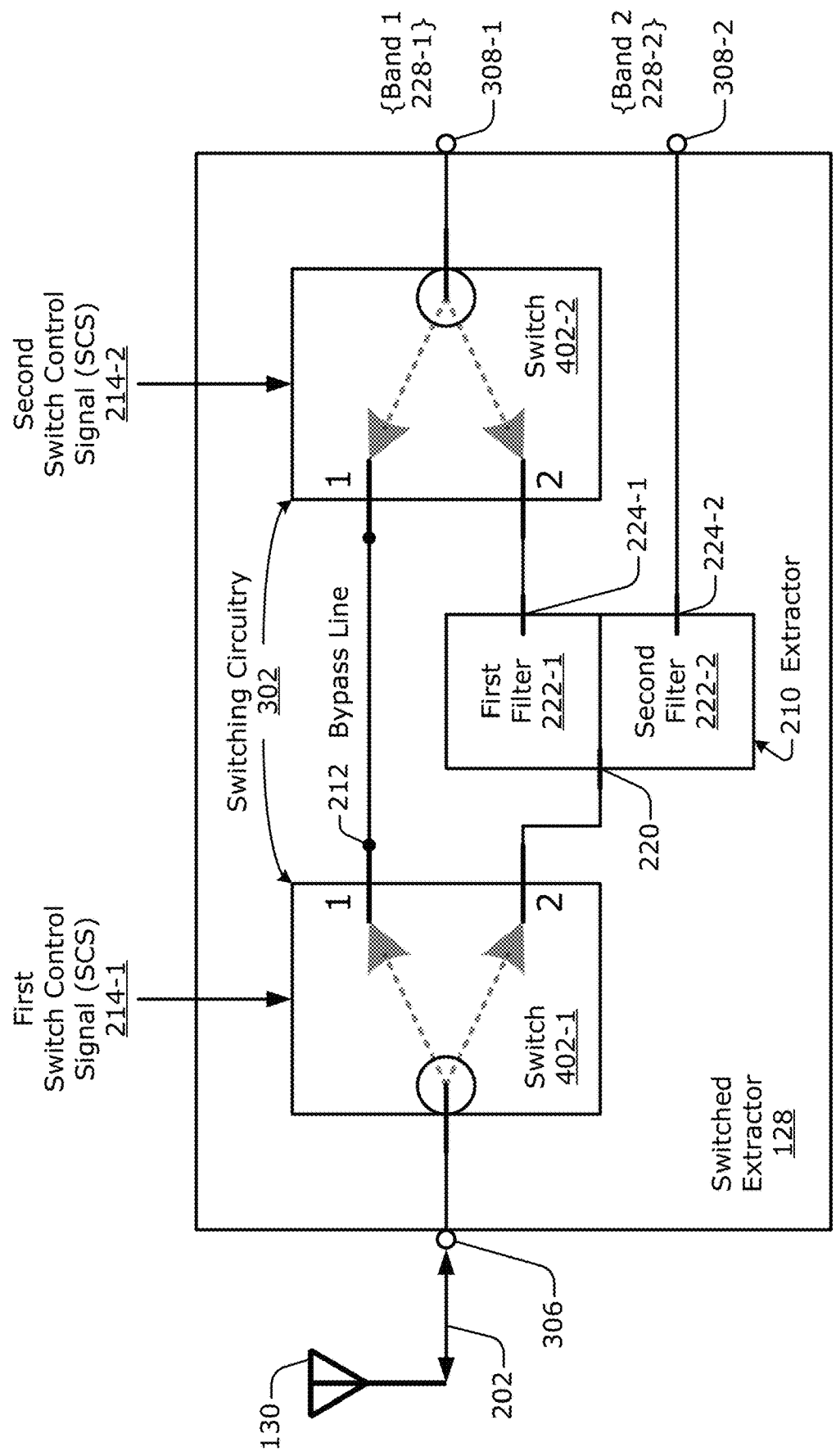
FIG. 4 is a schematic diagram illustrating an example switched extractor in which the switching circuitry is implemented using first and second switches.

FIG. 4 is a schematic diagram 400 illustrating an example switched extractor 128. Here, the switching circuitry 302 (as shown in FIGS. 3-1 and 3-2) includes a first switch 402-1 and a second switch 402-2. The switch control signal 214 includes a first switch control signal 214-1 and a second switch control signal 214-2. In operation, the first switch 402-1 is configured to be responsive to the first switch control signal 214-1, and the second switch 402-2 is configured to be responsive to the second switch control signal 214-2.

The first switch 402-1 includes a switch port (on the left or antenna side), a first switch port (1), and a second switch port (2). Thus, the first switch control signal 214-1 controls whether the switch port of the first switch 402-1 is connected to the first switch port (1) or the second switch port (2) of the first switch 402-1. The second switch 402-2 includes a first switch port (1), a second switch port (2), and a switch port (on the right or TRX side). Thus, the second switch control signal 214-2 controls whether the switch port of the second switch 402-2 is connected to the first switch port (1) or the second switch port (2) of the second switch 402-2.

As shown, the port 306 of the switched extractor 128 is coupled to the switch port of the first switch 402-1. The first switch port (1) of the first switch 402-1 is coupled to the first switch port (1) of the second switch 402-2 via the bypass line 212. The bypass line 212 can be implemented using a wire, a conductive strip, etc. on an integrated circuit or an electro-acoustic chip; a trace on a printed circuit board (PCB), a laminate, or a high temperature co-fired ceramic (HTCC) or low temperature co-fired ceramic (LTCC) carrier; and so forth. The bypass line 212 can include a buffer, a signal booster, a lowpass filter, a high-pass filter, and the like to condition the wireless signal 202 that is not propagating through the extractor 210. For example, in some implementations, a filter of the bypass line 212 may employ a wider or otherwise more flexible transition band (e.g., filter skirt) than that of the extractor 210. In other implementations, the bypass line 212 may have a lower or otherwise different insertion loss for certain signals or frequencies as compared to that of the extractor 210. The second switch port (2) of the first switch 402-1 is coupled to the port 220 of the extractor 210. The first port 224-1 of the first filter 222-1 of the extractor 210 is coupled to the second switch port (2) of the second switch 402-2. The second port 224-2 of the second filter 222-2 of the extractor 210 is coupled to the second port 308-2 of the switched extractor 128. The switch port of the second switch 402-2 is coupled to the first port 308-1 of the switched extractor 128.

Generally, the switching circuitry 302 is configured to selectably connect the port 306 of the switched extractor 128 to the first port 308-1 via the bypass line 212 or via the first filter 222-1 of the extractor 210. The switching circuitry 302 is also configured to selectably connect the port 306 of the switched extractor 128 to the second port 308-2 via the second filter 222-2 of the extractor 210 responsive to connection of the port 306 to the first port 308-1 via the first filter 222-1 of the extractor 210. Thus, if the first port 308-1 is coupled to the port 306 via the first filter 222-1, then the second port 308-2 is coupled to the port 306 via the second filter 222-2. Otherwise, the first port 308-1 is coupled to the port 306 via the bypass line 212, and the second port 308-2 is disconnected from the port 306 or unused. Example switch positions for the first switch 402-1 and the second switch 402-2 to support these configurations or modes are described with reference to FIGS. 5-1 and 5-2.

Figures 1, 5:
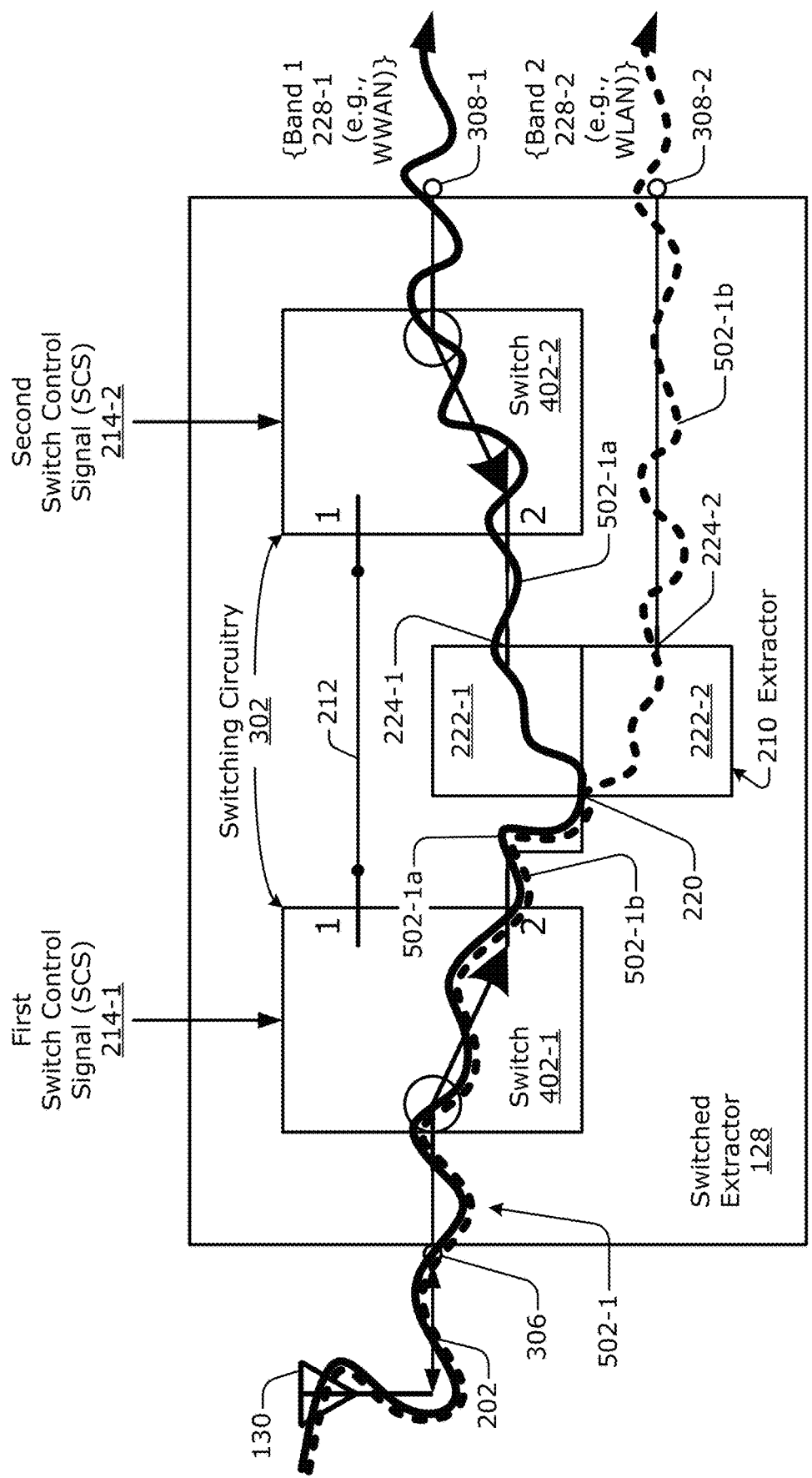
Figures 2, 5:
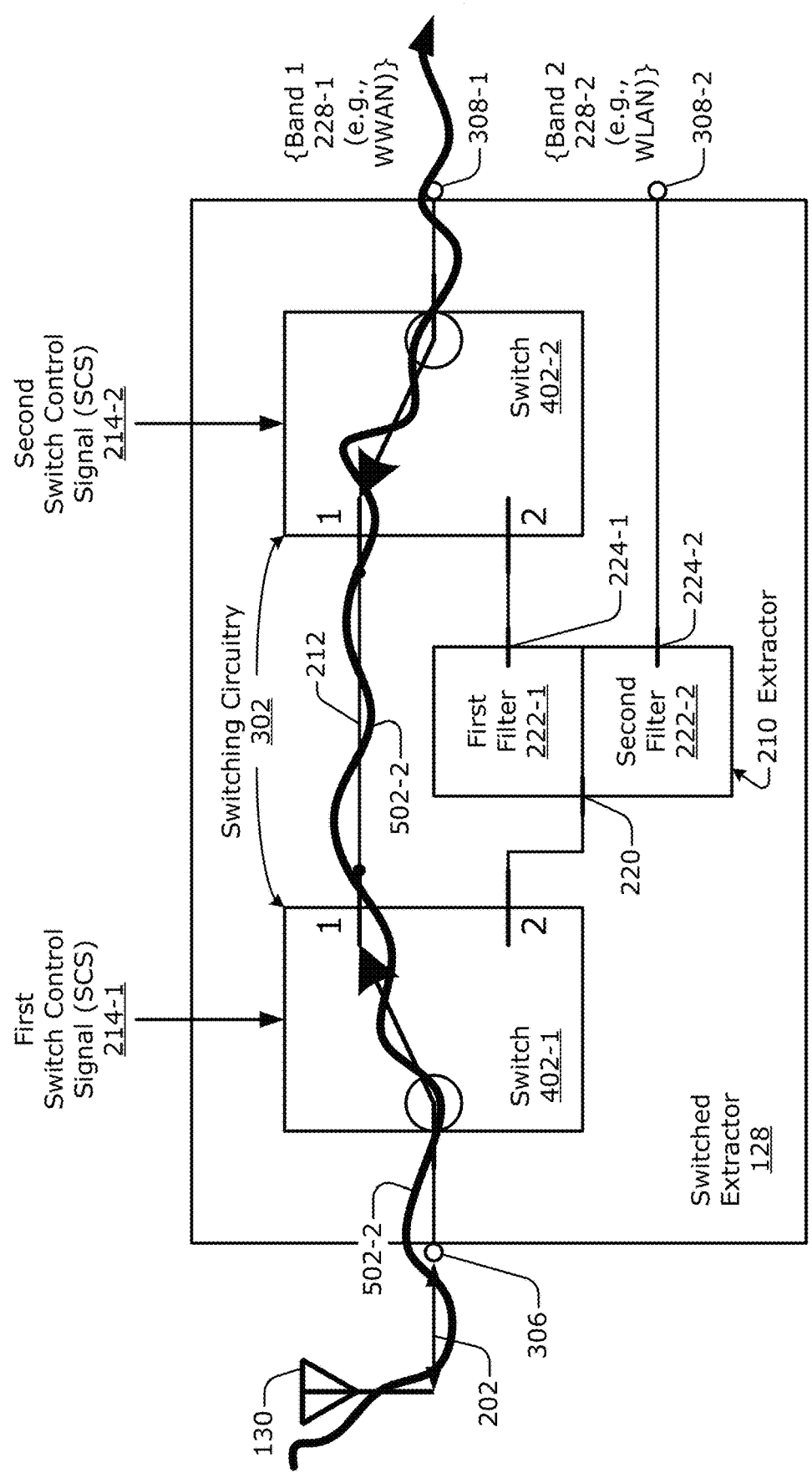

FIG. 5-1 illustrates generally at 500-1 a switched extractor 128 as in FIG. 4 that depicts an example concurrent signal path 502-1 for a concurrency mode. In this example concurrency mode for the switched extractor 128, the switched extractor 128 provides the concurrent signal path 502-1 for both the first band 228-1 and the second band 228-2. To realize the concurrent signal path 502-1, the switch control signal 214 controls the switching circuitry 302. The first switch control signal 214-1 causes the first switch 402-1 to connect the switch port thereof to the second switch port (2) thereof. The second switch control signal 214-2 causes the second switch 402-2 to connect the second switch port (2) thereof to the switch port thereof.

Consequently, the joint concurrent signal path 502-1 extends through the switched extractor 128 and to the extractor 210 where the signal path diverges into two separate concurrent signal paths 502-1*a* and 502-1*b*. Until the extractor 210, the joint concurrent signal path 502-1 extends through the following ports: the port 306 of the switched extractor 128, the switch port of the first switch 402-1, the second switch port (2) of the first switch 402-1, and the port 220 of the extractor 210. In a first concurrent signal path 502-1a, the signal path 502-1 extends from the port 220 through the first filter 222-1 of the extractor 210. The first concurrent signal path 502-1a also extends through multiple ports: the first port 224-1 of the extractor 210, the second switch port (2) of the second switch 402-2, the switch port of the second switch 402-2, and the first port 308-1 of the switched extractor 128.

In a second concurrent signal path 502-1b, the signal path 502-1 extends from the port 220 through the second filter 222-2 of the extractor 210. The second concurrent signal path 502-1b also extends through multiple ports: the second port 224-2 of the extractor 210 and the second port 308-2 of the switched extractor 128. In an example implementation, the first band 228-1 corresponds to a cellular or WWAN technology, and the second band 228-2 corresponds to a Wi-Fi or WLAN technology. With the concurrent signal path 502-1 of the concurrency mode, information contained in signals for both the first and second bands 228-1 and 228-2 can be extracted and can be used simultaneously. For a receive operation, the first concurrent signal path 5021-a is forwarded to one transceiver unit 126 that correspond to WWAN communications, and the second concurrent signal path 502-1b is forwarded to another transceiver unit 126 that corresponds to WLAN communications.

FIG. 5-2 illustrates generally at 500-2 a switched extractor 128 as in FIG. 4 that depicts an example bypass signal path 502-2 for a bypass mode. In this example bypass mode for the switched extractor 128, the switched extractor 128 establishes or provides the bypass signal path 502-2 for the first band 228-1 instead of the first concurrent signal path 502-1a. To realize the bypass signal path 502-2, the switch control signal 214 controls the switching circuitry 302. The first switch control signal 214-1 causes the first switch 402-1 to connect the switch port thereof to the first switch port (1) thereof. The second switch control signal 214-2 causes the second switch 402-2 to connect the first switch port (1) thereof to the switch port thereof.

Consequently, the bypass signal path 502-2 extends through the bypass line 212. The bypass signal path 502-2 also extends through the following ports: the port 306 of the switched extractor 128, the switch port of the first switch 402-1, the first switch port (1) of the first switch 402-1, the first switch port (1) of the second switch 402-2, the switch port of the second switch 402-2, and the first port 308-1 of the switched extractor 128. In an example implementation, the first band 228-1 corresponds to a cellular or WWAN technology. As used herein, a port may comprise an "input port" at one moment for one communication operation and an "output port" at another moment for another communication operation. For example, with a signal-receiving operation, the first port 308-1 comprises an output port of the switched extractor 128. However, with a signal-transmitting operation, the first port 308-1 comprises an input port of the switched extractor 128 because signals are traveling in the opposite direction for signal-transmitting operations. Example routings for a concurrent signal path and a bypass signal path are described below for an electronic device having multiple antennas with reference to FIG. 9-1 and FIGS. 9-2 and 9-3, respectively, for different MIMO configurations, with the electronic device including a switched extractor 128 having multiple bypass lines 212 like that described with reference to FIG. 6.

Figure 6:
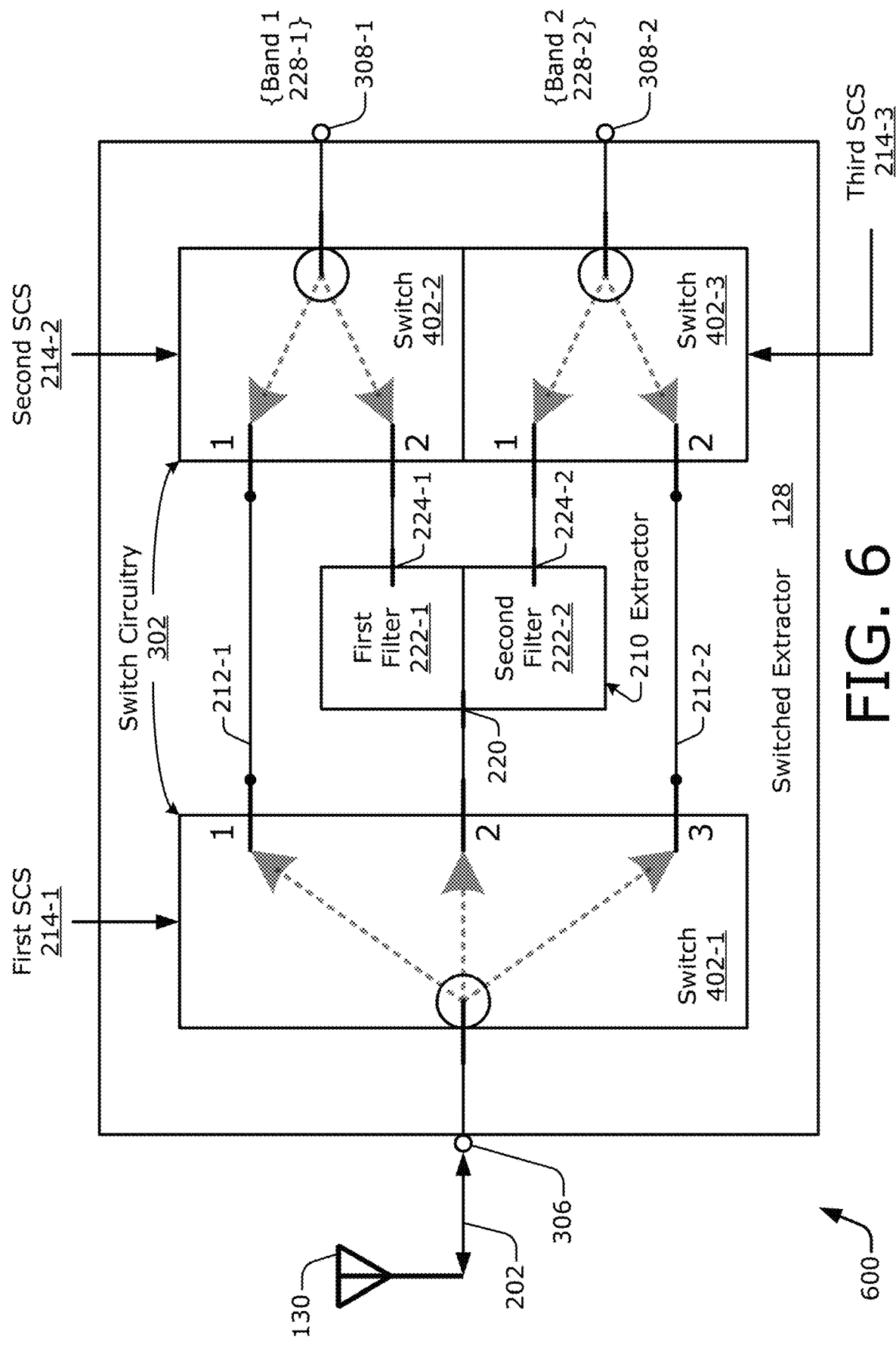
FIG. 6 illustrates another example switched extractor having two bypass lines and in which the switching circuitry is implemented using first, second, and third switches.

FIG. 6 illustrates generally at 600 another example switched extractor 128. However, the switched extractor 128 of FIG. 6 includes two bypass lines 212, and the switching circuitry 302 (e.g., also of FIGS. 3-1 and 3-2) is implemented using three switches. As shown, the switching circuitry 302 includes a first switch 402-1, a second switch 402-2, and a third switch 402-3. The switch control signal 214 includes a first switch control signal 214-1, a second switch control signal 214-2, and a third switch control signal 214-3. Each of the first, second, and third switches 402-1, 402-2, and 402-3 connects a switch port to another switch port based respectively on the first, second, and third switch control signals 214-1, 214-2, and 214-3. In alternative implementations, the second switch 402-2 and the third switch 402-3 can be equivalently implemented as one 4×2 switch—e.g., a switch with four ports on the left and two ports on the right, even if all of the ports on the left cannot necessarily be connected to every port on the right. Further, the switched extractor 128 incudes multiple bypass lines: a first bypass line 212-1 and a second bypass line 212-2.

For example implementations of a switched extractor 128 as described above with reference to FIG. 4, one of the two TRX-side ports 308 can be connected to the antenna-side port 306 without a signal path that traverses the extractor 210. In contrast, for example implementations of a switched extractor 128 as depicted in FIG. 6, either of the two TRX-side ports 308 can be connected to the antenna-side port 306 without a signal path traversing the extractor 210. Thus, three different signal path modes can be implemented by the switched extractor 128. These signal path modes include a bypass mode for the first band 228-1, a bypass mode for the second band 228-2, and a concurrency mode for both the first and second bands 228-1 and 228-2.

For the bypass mode for the first band 228-1, the first switch control signal 214-1 causes the first switch 402-1 to connect the antenna-side switch port thereof to the first switch port (1) thereof. The second switch control signal 214-2 causes the second switch 402-2 to connect the first switch port (1) thereof to the TRX-side switch port thereof. Thus, the switched extractor controller 132 (e.g., of FIG. 2-1) establishes a first bypass signal path from the port 306 of the switched extractor 128, through the first switch 402-1, over the first bypass line 212-1, through the second switch 402-2, and to the first port 308-1 of the switched extractor 128.

For the bypass mode for the second band 228-2, the first switch control signal 214-1 causes the first switch 402-1 to connect the antenna-side switch port thereof to the third switch port (3) thereof. The third switch control signal 214-3 causes the third switch 402-3 to connect the second switch port (2) thereof to the TRX-side switch port thereof. Thus, the switched extractor controller 132 establishes a second bypass signal path from the port 306 of the switched extractor 128, through the first switch 402-1, over the second bypass line 212-2, through the third switch 402-3, and to the second port 308-2 of the switched extractor 128.

For the concurrency mode for both the first band 228-1 and the second band 228-2, the first switch control signal 214-1 causes the first switch 402-1 to connect the antenna-side switch port thereof to the second switch port (2) thereof. The second switch control signal 214-2 causes the second switch 402-2 to connect the second switch port (2) thereof to the TRX-side switch port thereof. The third switch control signal 214-3 causes the third switch 402-3 to connect the first switch port (1) thereof to the TRX-side switch port thereof. Thus, the switched extractor controller 132 establishes two concurrent signal paths having a joint or overlapping portion from the port 306 of the switched extractor 128, through the first switch 402-1, and to the extractor 210. One individual concurrent signal path extends through the first filter 222-1, through the second switch 402-2, and to the first port 308-1 of the switched extractor 128 for the first band 228-1. Another individual concurrent signal path extends through the second filter 222-2, through the third switch 402-3, and to the second port 308-2 of the switched extractor 128 for the second band 228-2.

Figure 7:
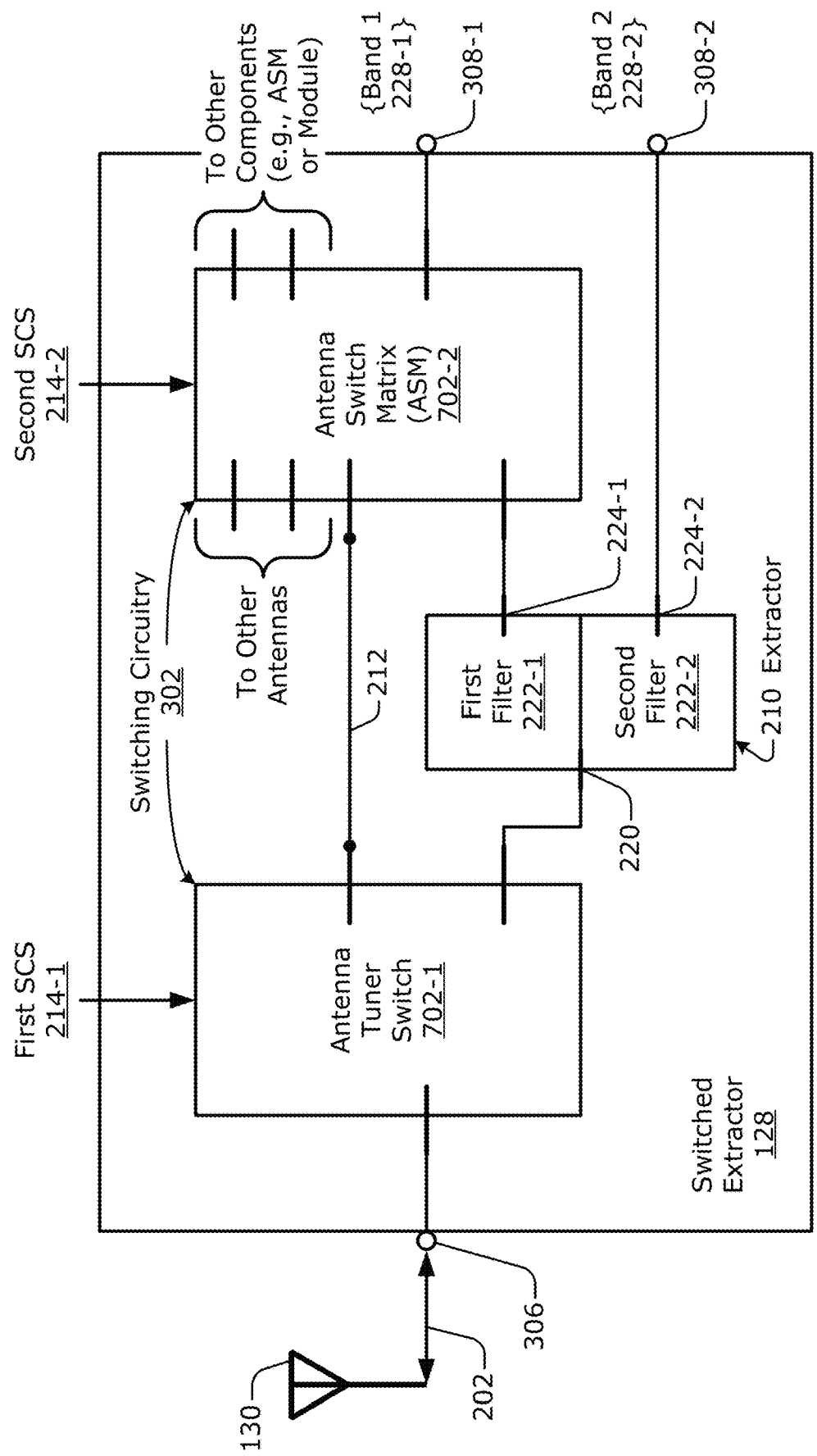
FIG. 7 illustrates another example switched extractor in which the switching circuitry is implemented using one or more switches that also perform another function.

FIG. 7 illustrates generally at 700 another example switched extractor 128 in which the switching circuitry 302 is implemented using one or more switches that also perform another function. As shown, the switching circuitry 302 includes two combination switches: an antenna tuner switch 702-1 and an antenna switch matrix 702-2. In other implementations, one combination switch may be employed as the first or second switch of the switched extractor 128. In the illustrated example implementation, the antenna tuner switch 702-1 combines antenna tuning functionality with switching functionality of the first switch 402-1 (e.g., of FIG. 4). Thus, responsive to the first switch control signal 214-1, the antenna tuner switch 702-1 can adjust a targeted frequency of the antenna 130. The antenna tuner switch 702-1 can also route a wireless signal 202 from the port 306 of the switched extractor 128 either around the extractor 210 using the bypass line 212 or to the input 220 of the extractor 210.

Similarly, the antenna switch matrix 702-2 combines general antenna switching functionality with the band-extraction switching functionality of the second switch 402-2 (e.g., of FIG. 4). As indicated in FIG. 7, the antenna switch matrix 702-2 includes two other ports (on the left) that are coupled to other antennas and two other ports (on the right) that are coupled to other components (e.g., another antenna switch matrix (ASM) or a module such as a transceiver unit) (not shown in FIG. 7). The antenna switch matrix 702-2 can therefore be implemented as a 4×3 switch here; however, other switch sizes with a different number of ports on either or both sides can be alternatively employed. Thus, responsive to the second switch control signal 214-2, the antenna switch matrix 702-2 can connect or route signals received via different antennas to different transceiver units. For the band-extraction switching functionality, the antenna switch matrix 702-2 can also help route a wireless signal 202 from the antenna 130 either around the extractor 210 via the bypass line 212 or from the first output 224-1 of the extractor 210 (e.g., at the first filter 222-1) to the first port 308-1 of the switched extractor 128. The antenna tuner switch 702-1 and the antenna switch matrix 702-2 can also switch or route signals propagating in the opposite direction for a signal-transmitting operation.

Figures 1, 8:
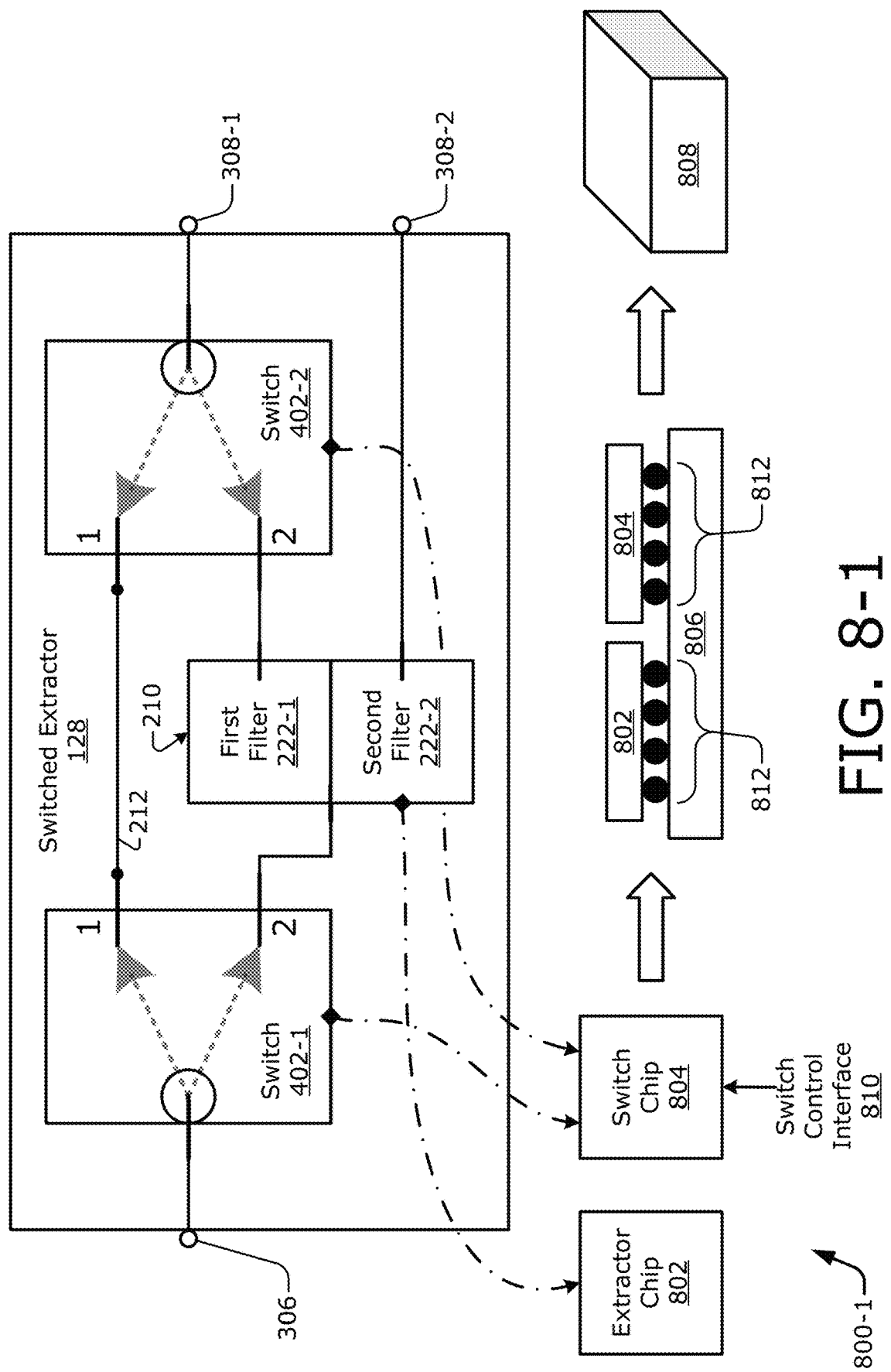
Figures 2, 8:
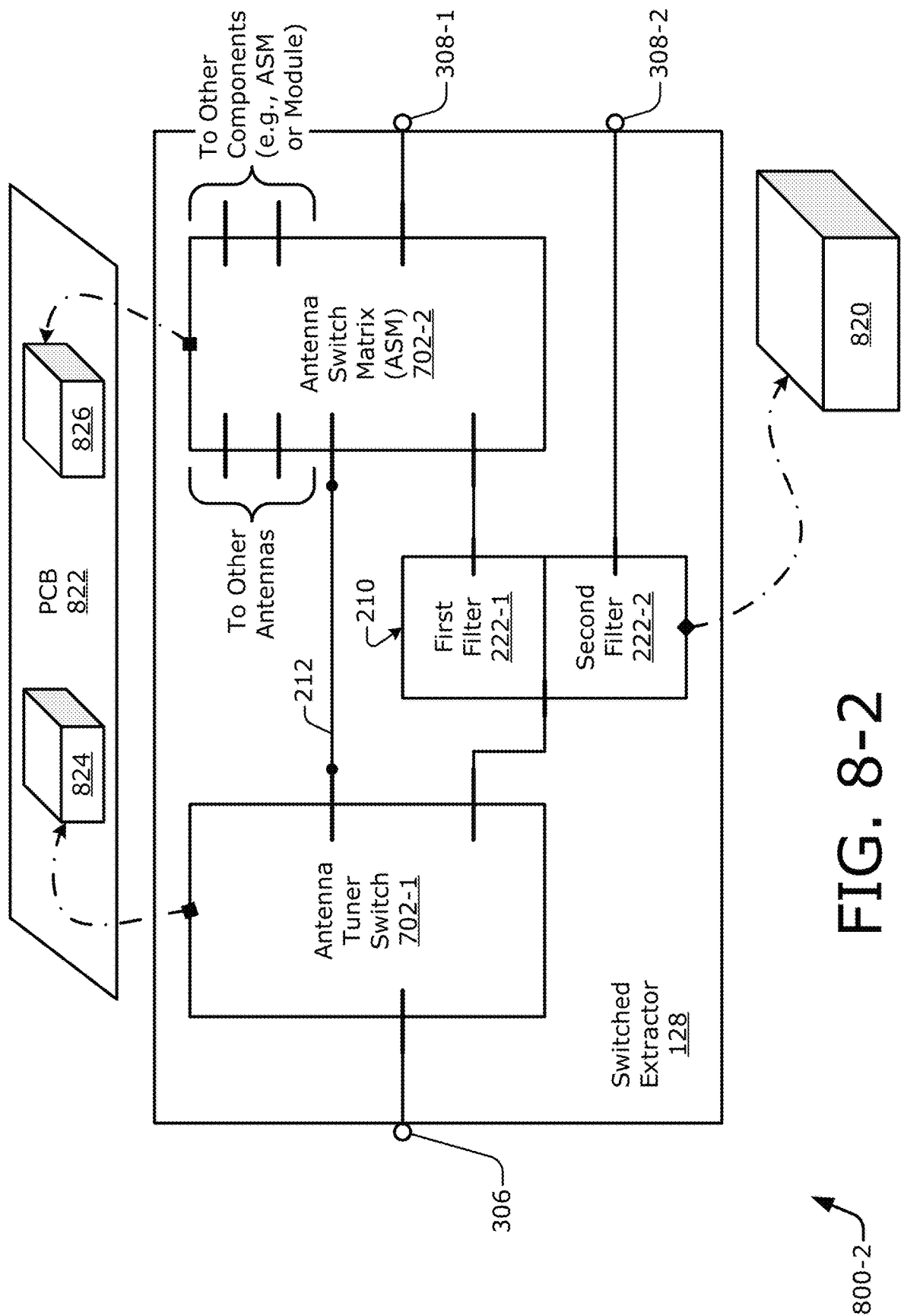

FIGS. 8-1 and 8-2 illustrate, generally at 800-1 and 800-2, respectively, example approaches to packaging and otherwise realizing a switched extractor 128 as part of an electronic device. In FIG. 8-1, the switched extractor 128 is manufactured into one package 808 that includes two chips. The extractor 210 is fabricated on an extractor chip 802, which may be at least partly made of an electro-acoustic material such as lithium niobate, lithium tantalite, or aluminum nitride. The first switch 402-1 and the second switch 402-2 are fabricated together on a switch chip 804. The switch chip 804 includes a switch control interface 810 (e.g., MIPI or GPIO) for communicating the switch control signal 214 (e.g., of FIGS. 2-1 and 4). The extractor chip 802 and the switch chip 804 are secured to a support structure 806, such as a rigid or flexible printed circuit board (PCB), a laminate, or an HTCC or LTCC carrier. The extractor chip 802 and the switch chip 804 are secured to the support structure 806 using an electrically-coupling mechanism 812, such as at least one ball grid array (BGA), one or more solder bumps, one or more stud bumps, one or more copper pillars, and so forth. The extractor chip 802, the switch chip 804, and the support structure 806 are then encapsulated in the package 808, such as a chip-sized SAW (surface acoustic wave) package (CSSP).

Electroacoustic filter components, such as a chip carrying SAW, BAW, and/or GBAW filter structures, are typically deployed with a cavity that separates the filter structures from other structures that might dissipate acoustic energy. To that end, the corresponding electroacoustic filter chip may carry the sensitive electroacoustic filter components at one surface. The electroacoustic filter chip may be arranged in a flip-chip configuration in which the electroacoustic filter chip is electrically and mechanically connected to the carrier substrate. An accompanying IC chip may be disposed next to the electroacoustic filter chip on the carrier substrate. A sealing bulk material (e.g., glob top) may be used to hermetically seal and mechanically protect the chips on the carrier substrate. Then, the electroacoustic filter chip and the IC chip are embedded within a glob top material, e.g., within a molding mask.

Bump connections establishing electrical and physical connection between the electroacoustic filter chip and the carrier substrate may provide a distance between the carrier substrate and the electroacoustic filter chip to obtain a cavity. To prevent the glob top material from entering the cavity between the electroacoustic chip and the carrier substrate, a foil can be arranged that covers a top side of the electroacoustic filter chip, side portions of the electroacoustic filter chip, a vertical distance between the electroacoustic filter chip and the carrier substrate, and a top surface of the carrier substrate at least in the vicinity of the electroacoustic filter chip. The IC chip can also be arranged in a flip-chip-configuration. The foil can further cover the IC chip.

A lateral dimension of the glob top material and of the carrier substrate may be substantially identical. The lateral area and/or the lateral dimensions of the carrier substrate may be essentially the same as a sum of the area of the electroacoustic filter chip and the IC chip. In an example, a corresponding module can comprise the electroacoustic filter chip in a bare die configuration. Thus, the lateral dimensions of an amplifier module may substantially equal a sum of the areas of the contained chips. A package of such a module is known as a chip-size SAW package (CSSP) in the field of electroacoustic filter chips.

In FIG. 8-2, the switched extractor 128 is manufactured into multiple packages. This approach can be used if, for example, the switching functionality of the switched extractor 128 is combined with other switching functions. As shown, the switching components of the switched extractor 128 are integrated with the antenna tuner switch 702-1 and the antenna switch matrix 702-2. An integrated circuit chip including the antenna tuner switch 702-1 is encapsulated in a package 824, and an integrated circuit chip including the antenna switch matrix 702-2 is encapsulated in a package 826. The package 824 and the package 826 are mounted on a rigid or flexible printed circuit board 822. Alternatively, the antenna tuner switch 702-1 and the antenna switch matrix 702-2 can be jointly integrated onto one chip and encapsulated within one package or integrated into different chips but encapsulated within one package. An electro-acoustic chip including the extractor 210 is encapsulated in another package 820. Although not explicitly depicted as such, the package 820 can also be mounted on (e.g., disposed on and electrically coupled to) the printed circuit board 822 along with the packages 824 and 826. Although two example packaging approaches are depicted in FIGS. 8-1 and 8-2 and described herein, a switched extractor 128 may be implemented in an electronic device 102 in a different manner.

FIGS. 9-1, 9-2, and 9-3 illustrate a portion of an electronic device having multiple antennas that are operating in different example multi-antenna configurations 900-1, 900-2, and 900-3, respectively. In the multi-antenna configuration 900-1, a switched extractor 128 is operated in a full concurrency mode. In the multi-antenna configurations 900-2 and 900-3, the switched extractor 128 is respectively operated in a first bypass mode for a first band and in a second bypass mode for a second band. Here, the switched extractor 128 is implemented as a double-bypass extractor by way of example. Thus, the second bypass line 212-2 is optional with regard to any of the example multi-antenna configurations 900-1 and 900-2. Similarly, the first bypass line 212-1 is optional with regard to any of the example multi-antenna configurations 900-1 and 900-3. The example illustrated multi-antenna environment of an electronic device is described generally first, and the different example multi-antenna configurations are described thereafter. As shown in FIGS. 9-1, 9-2 and 9-3, the electronic device includes multiple components, including multiple antennas 130, at least one filter 902, at least one N-plexer 904, at least one switch 906, and at least one wireless transceiver 122, in addition to the switched extractor 128. These components are interconnected using multiple electrically-conductive lines (e.g., wires or traces), which are depicted by relatively-thinner, straight lines having right angles.

As illustrated, the multi-antenna environment of the electronic device includes five antennas 130-1, 130-2, 130-3, 130-4, and 130-5. However, an electronic device may have more or fewer antennas. Further, a switched extractor 128 may operate in an environment with more or fewer antennas, including as few as one antenna. Each respective antenna 130 is coupled to a respective filter 902 or N-plexer 904. Thus, five total filters or N-plexers are coupled to the five antennas 130-1 . . . 130-5. N-plexers can include diplexers, triplexers, and so forth. An N-plexer can enable multiband antenna sharing with other modules that operate in different bands (e.g., 800 MHz, mid-band (such as 1700-2200 MHz), and 5 GHz). To do so, each N-plexer includes two or more filter units configured to attenuate frequencies that are to be blocked from further propagation. Thus, a triplexer may include a high-pass filter unit (e.g., for 5150-5925 MHz), a bandpass filter unit (e.g., for 3400-3800 MHz), and a low-pass filter unit (e.g., for 1400-2680 MHz). Although not shown, a respective conductive line extends from each respective filter unit to another respective component, such as a switch or transceiver unit.

Starting from the top right corner and moving clockwise, a first antenna 130-1 is coupled to a first N-plexer 904-1, and a second antenna 130-2 is coupled to a second N-plexer 904-2. A third antenna 130-3 is coupled to a third N-plexer 904-3, and a fourth antenna 130-4 is coupled to a fourth N-plexer 904-4. And a fifth antenna 130-5 is coupled to a filter 902. However, an electronic device may include a different number of filters or N-plexers, such as if an antenna 130 is associated with multiple filters or N-plexers. Here, each N-plexer 904 can be implemented using one or multiple filter units and corresponding filter paths extending from each filter unit. Each of the filter units can include, for example, a low pass filter, a high pass filter, or a bandpass filter.

The wireless transceiver 122 includes multiple transceiver units. Specifically, five transceiver units 126-1, 126-2, 126-3, 126-4, and 126-5 are shown. Each respective filter 902 or N-plexer 904 is coupled to at least one respective transceiver unit 126-1 to 126-5. Although five transceiver units 126-1 to 126-5 are shown, the wireless transceiver 122 can include a different number of transceiver units, such as if an antenna 130 and corresponding filter or N-plexer are coupled to more than one transceiver unit 126. For example, the fourth N-plexer 904-4 of the fourth antenna 130-4 can include three filter units (not shown) leading to three conductive lines (not explicitly depicted), with each conductive line coupled to a respective one of three transceiver units. In such an implementation, each of these three transceiver units can be used with the fourth N-plexer 904-4 and the fourth antenna 130-4.

Thus, a network of conductive lines, additional filters or N-plexers, buffers, splitters, switches, and so forth can extend between the filter and N-plexers that are depicted and the multiple transceiver units 126-1 to 126-5 as indicated by network 912. Although the network 912 is only explicitly indicated "on the left" of the wireless transceiver 122, the network 912 may also include such components "on the right" of the wireless transceiver 122. Further, for clarity, additional details of this network 912 are omitted from FIGS. 9-1 to 9-3. However, two switches are explicitly illustrated. A switch 906-1 is coupled between (i) the first N-plexer 904-1 and the second N-plexer 904-2 on one side and (ii) the third transceiver unit 126-3 and the fourth transceiver unit 126-4 on the other side. Also, a switch 906-2 is coupled between (i) the switched extractor 128 and the third N-plexer 904-3 on one side and (ii) the first transceiver unit 126-1 and the second transceiver unit 126-2 on the other side.

Figures 1, 9:
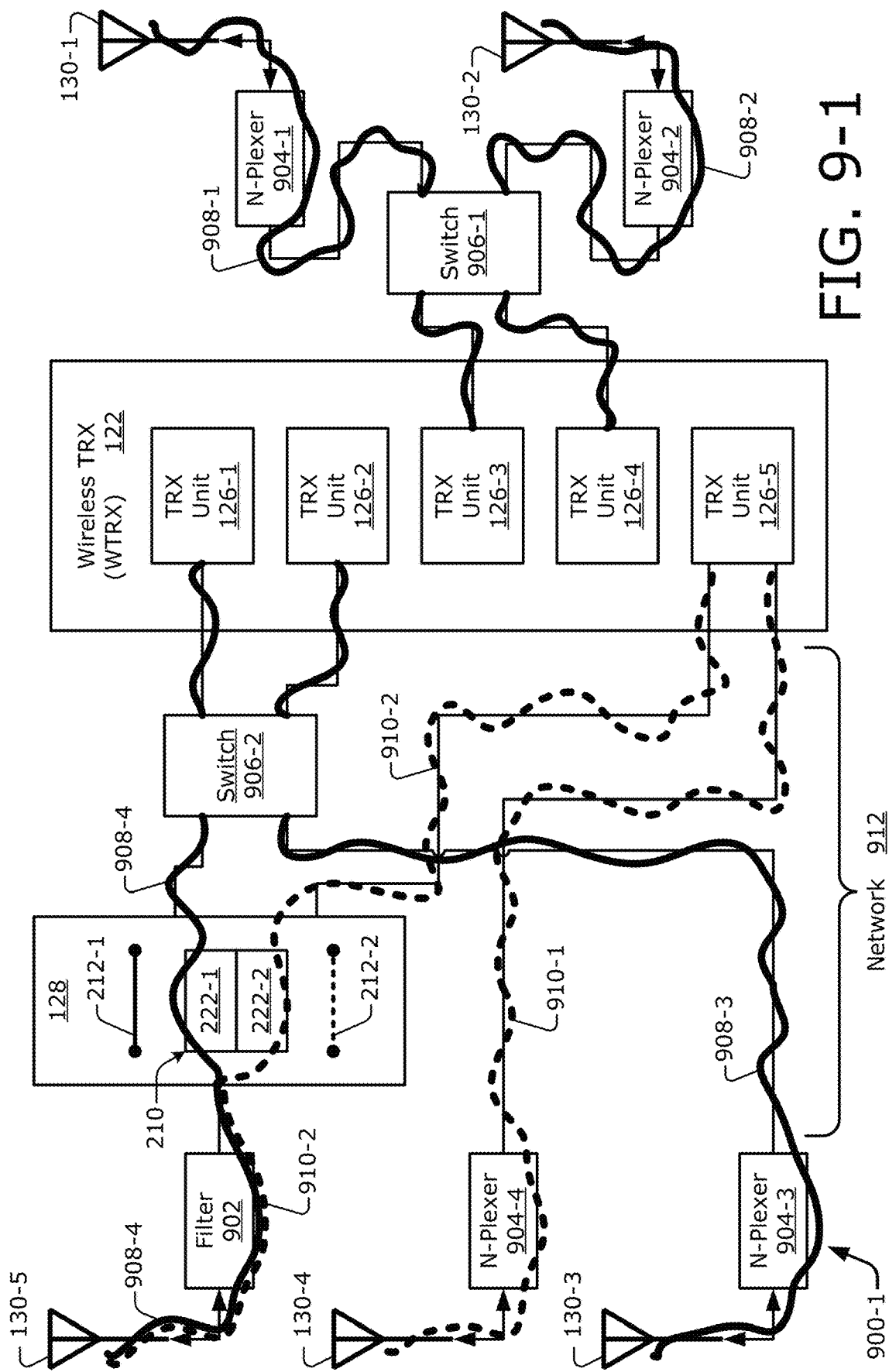
Figures 2, 9:
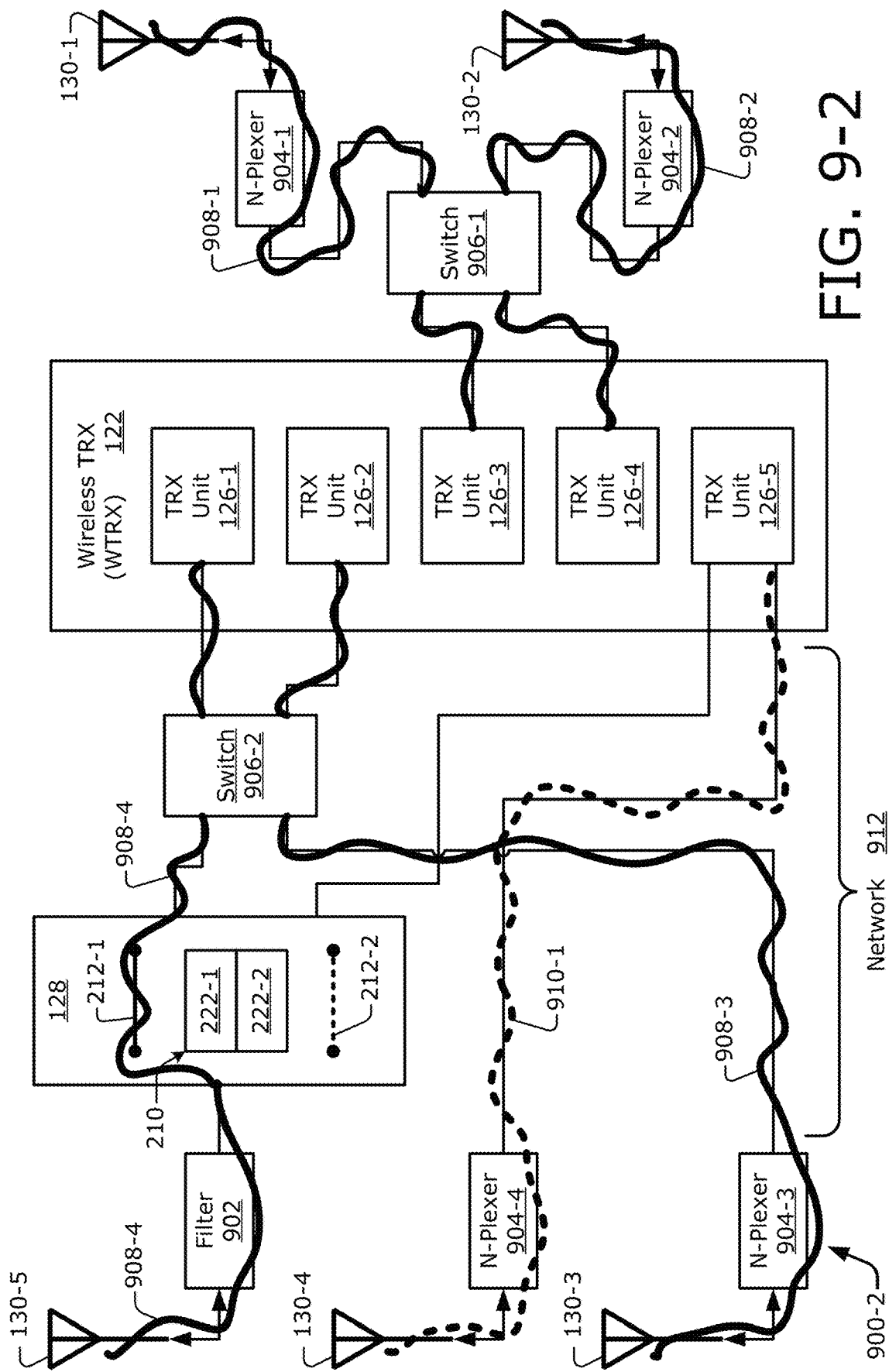
Figures 3, 9:
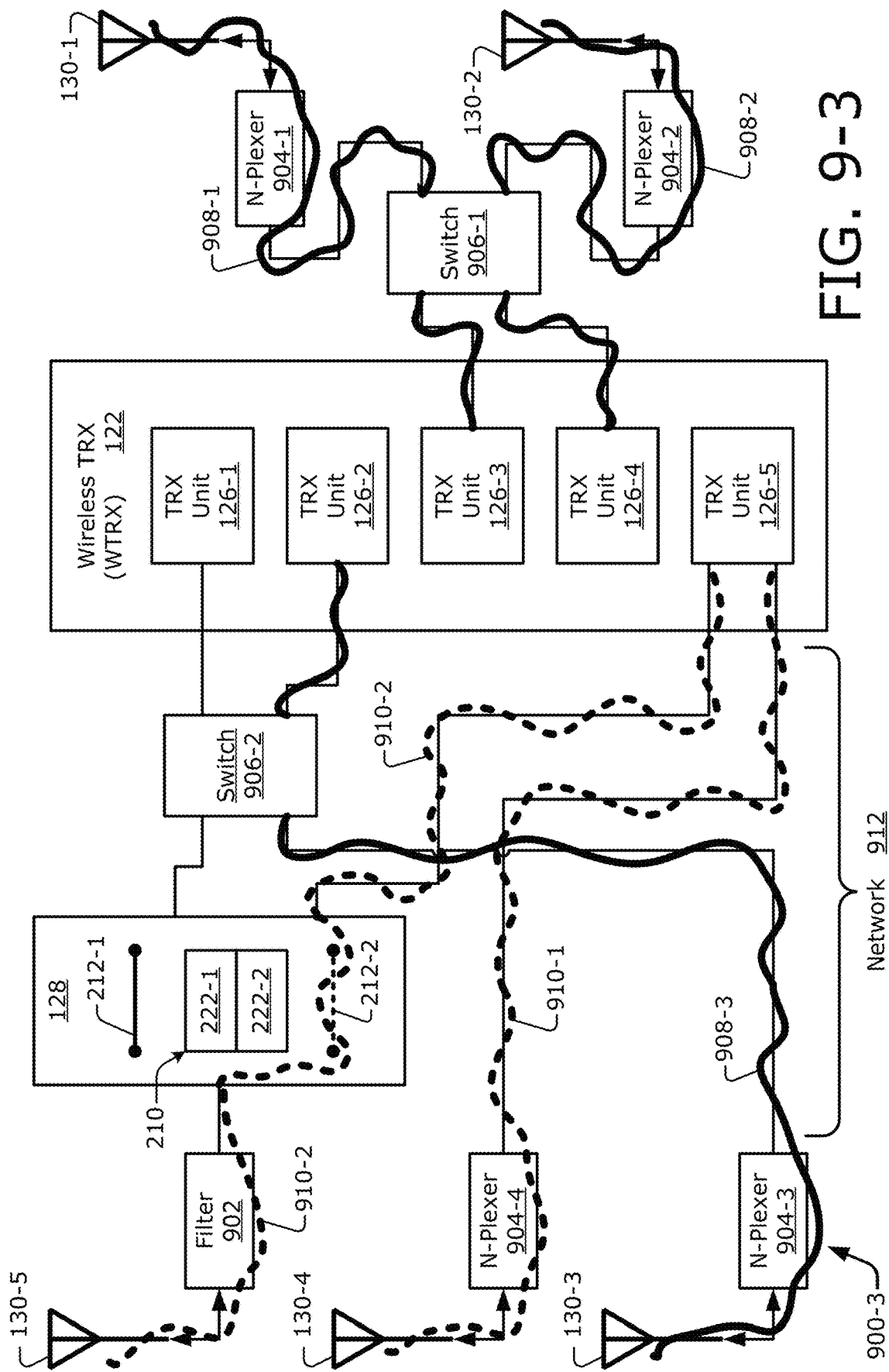

For FIGS. 9-1 to 9-3, a corresponding electronic device includes five antennas 130-1 to 130-5. With the smaller form factors of today's electronic devices, manufacturers are facing difficulties such as trying to include multiple antennas. This difficulty exists as wireless signaling protocols, signal processing strategies, and bandwidth-hungry applications are demanding an increasing number of antennas. Different antennas can be useful for signal diversity, various signal frequencies, different communication technologies, implementing multiple-input multiple output (MIMO) processing for multiple streams, carrier aggregation (CA), beamforming from a particular side of an electronic device, and so forth. Example scenarios that pertain to different frequencies, different communication technologies, and MIMO processing are described with reference to FIGS. 9-1 to 9-3.

In each of FIGS. 9-1 to 9-3, signal paths are represented by relatively-thicker, wavy lines. Solid thick lines correspond to a first band, and dashed thick lines correspond to a second band. In this example for FIGS. 9-1 to 9-3, the first band with the solid thick lines corresponds to a cellular or WWAN communication technology, and the second band with the dashed thick lines corresponds to a Wi-Fi or WLAN communication technology. For the full concurrency mode of the multi-antenna configuration 900-1, there are six total illustrated signal paths. There are four signal paths 908-1, 908-2, 908-3, and 908-4 for the cellular technology. This corresponds to a 4×4 MIMO configuration. There are two signal paths 910-1 and 910-2 for the Wi-fi technology. This corresponds to a 2×2 MIMO configuration. The bypass modes include fewer total signal paths and different MIMO configurations, as described below with reference to FIGS. 9-2 and 9-3.

In FIG. 9-1, the switched extractor 128 is operated in full concurrency mode with 4×4 MIMO for a cellular connection and 2×2 MIMO for a Wi-Fi connection. The switched extractor 128 is operating in an extractor state. Thus, there are four signal paths 908-1 to 908-4 for the cellular band, and there are two signal paths 910-1 and 910-2 for the Wi-Fi band. The signal path 908-1 extends from the first antenna 130-1, over the first N-plexer 904-1, through the switch 906-1, and to the third transceiver unit 126-3. The signal path 908-2 extends from the second antenna 130-2, over the second N-plexer 904-2, through the switch 906-1, and to the fourth transceiver unit 126-4. The signal path 908-3 extends from the third antenna 130-3, over the third N-plexer 904-3, through the switch 906-2, and to the second transceiver unit 126-2. Also, the signal path 908-4 extends from the fifth antenna 130-5, over the filter 902, through the extractor 210 of the switched extractor 128 via the filter 222-1, through the switch 906-2, and to the first transceiver unit 126-1. The signal path 910-1 extends from the fourth antenna 130-4, over the fourth N-plexer 904-4, and to the fifth transceiver unit 126-5. Also, the signal path 910-2 extends from the fifth antenna 130-5, over the filter 902, through the extractor 210 via the filter 222-2, and to the fifth transceiver unit 126-5. Thus, the fifth transceiver unit 126-5 can achieve communication while omitting the switched extractor 128 by using the signal path 910-1.

By sharing the fifth antenna 130-5, the cellular connection can utilize the 4×4 MIMO signaling processing, and the Wi-Fi connection can utilize the 2×2 MIMO signaling processing. Generally, higher configurations of MIMO provide a superior connection quality in terms of coverage area or range, bandwidth, signal strength, throughput, noise rejection, and so forth. For example, with two antennas, reception amplitude can increase by approximately 3 decibels (dB), coverage can be larger, and/or throughput can be higher. Thus, sharing the fifth antenna 130-5 using the extractor 210 of the switched extractor 128 can increase one or more of these connection characteristics or band parameters without including another antenna. However, other factors may outweigh the increase in these connection characteristics. For example, the extractor 210 does create some insertion loss (IL), which can reduce the signal strength seen at the first transceiver unit 126-1 for the part of the 4×4 MIMO cellular connection provided by the signal path 908-4.

Also, some cellular bands are adjacent or otherwise proximate to a given Wi-Fi frequency band, such as certain LTE bands that are proximate to the 2.4 gigahertz (GHz) frequency band of, e.g., Wi-Fi. One frequency band may, for example, at least partially overlap another frequency band in absolute frequency terms or due to non-vertical filter skirts. In such a situation, extracting the Wi-Fi frequency band from the cellular signal may adversely impact the information carried on the desired cellular band that is proximate to the Wi-Fi band. In these kinds of situations, an electronic device may be able to provide a better overall wireless-connection experience for an end user by, for instance, relinquishing the 2×2 MIMO for the Wi-Fi. To do so, the switched extractor 128 can disconnect the extractor 210 and connect the first bypass line 212-1. With this switching, a signal that is unaffected by the extractor 210 can be provided to the first transceiver unit 126-1 for the signal path 908-4. Additionally, current drain can be reduced by switching to a bypass signal path that extends over the first bypass line 212-1 for the cellular connection or over the second bypass line 212-2 for the Wi-Fi connection.

In FIG. 9-2, for the multi-antenna configuration 900-2, the switched extractor 128 is operated in a first bypass mode for a first band. Thus, the switched extractor 128 is operating in a bypass-for-WWAN state. The cellular connection again has four signal paths 908-1 to 908-4 with a 4×4 MIMO configuration; however, the Wi-Fi connection has but one signal path 910-1 with a 1×1 MIMO configuration. The switched extractor 128 routes a signal path through the first bypass line 212-1 to establish the first bypass mode for the first band. Specifically, the signal path 908-4 is routed from the fifth antenna 130-5, through the filter 902, over the first bypass line 212-1 of the switched extractor 128, through the switch 906-2, and to the first transceiver unit 126-1. This can free the signal path 908-4 from extractor-induced insertion loss, from attenuation of a desirable signal if a frequency range of the extracted signal is too close to a frequency range of the desirable signal, and so forth. In this first bypass mode, the cellular communication continues with a 4×4 MIMO configuration. The Wi-Fi communication, on the other hand, is reduced to a 1×1 MIMO configuration with the signal path 910-1, which extends from the fourth antenna 130-4, over the fourth N-plexer 904-4, and to the fifth transceiver unit 126-5. Nevertheless, the fifth transceiver unit 126-5 can be continuing to actively communicative using one signal path. Although the signal quality for the Wi-Fi communication is likely to be reduced, this may be an acceptable tradeoff if the cellular communication has a higher priority or a greater return on signal improvement than the Wi-Fi has signal loss with this switching arrangement for the multi-antenna configuration 900-2.

In FIG. 9-3, for the multi-antenna configuration 900-3, the switched extractor 128 is operated in a second bypass mode for a second band. Thus, the switched extractor 128 is operating in a bypass-for-WLAN state. The switched extractor 128 routes a bypass signal path through the second bypass line 212-2 to establish the second bypass mode. Specifically, the signal path 910-2 is routed from the fifth antenna 130-5, through the filter 902, over the second bypass line 212-2 of the switched extractor 128, and to the fifth transceiver unit 126-5. This can free the signal path 910-2 from extractor-induced insertion loss, from attenuation of frequencies proximate to an edge of a notched band, and so forth. In this second bypass mode, the Wi-Fi communication continues with a 2×2 MIMO configuration. The cellular communication, on the other hand, is reduced to a 3×3 MIMO configuration with the signal paths 908-1, 908-2, and 908-3. Although the signal quality for the cellular communication is likely to be reduced, this may be an acceptable tradeoff if, for instance, greater bandwidth or range for the Wi-Fi communication is currently a higher priority.

Figures 1, 10:
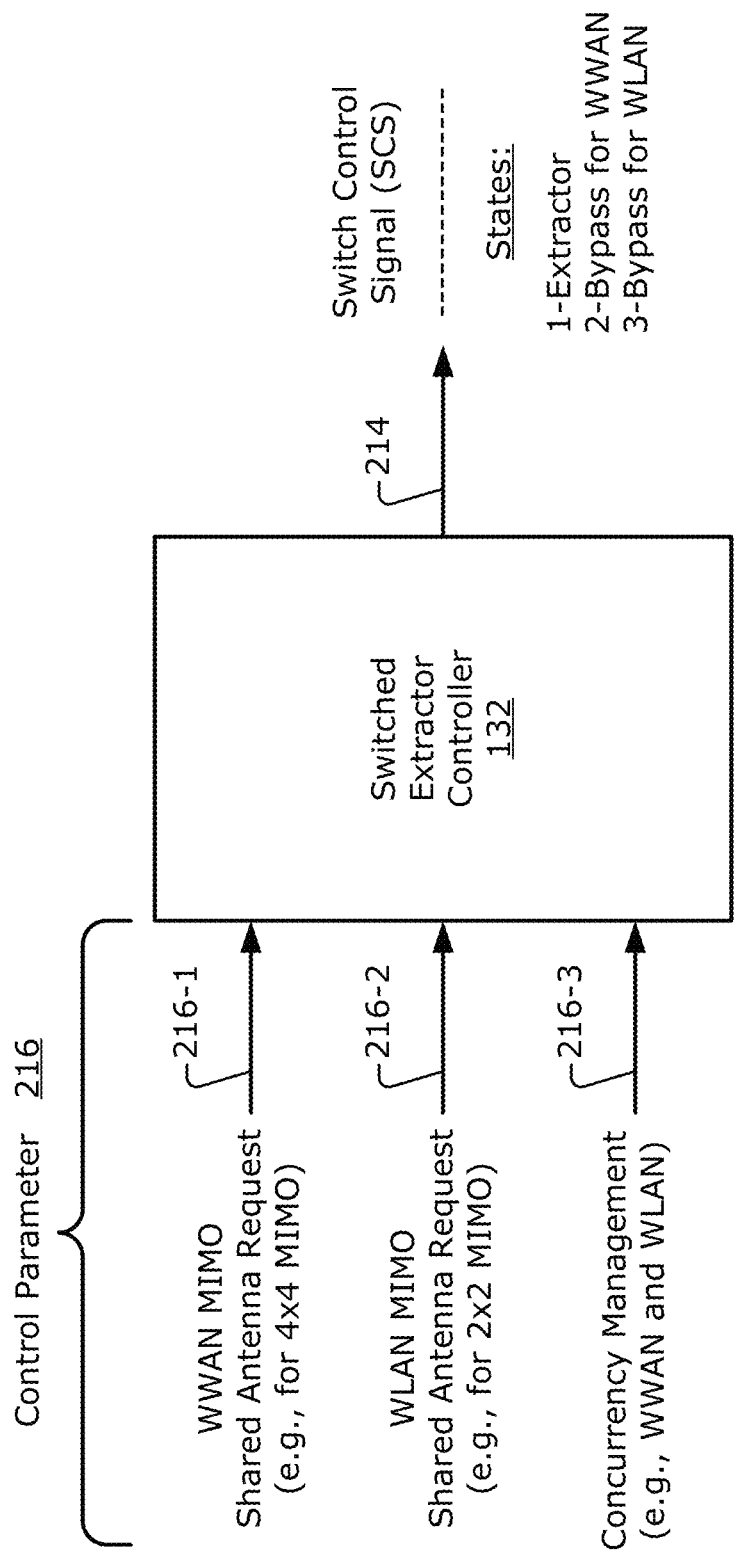
Figures 2, 10:
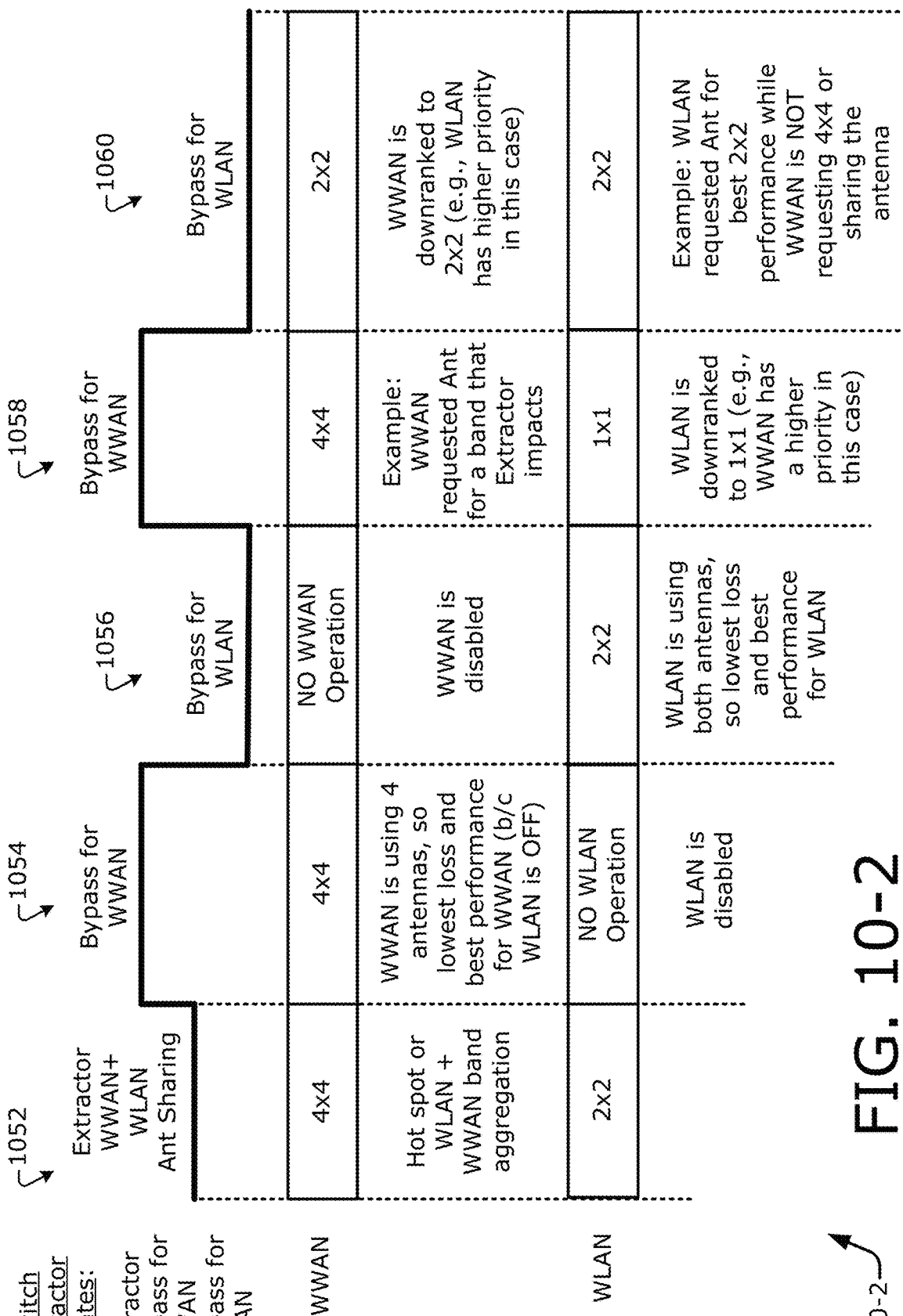

FIG. 10-1 illustrates generally at 1000-1 an example implementation for a switched extractor controller 132 for enhanced antenna utilization. The switched extractor controller 132 accepts as input one or more control parameters 216 and provides as output at least one switch control signal 214. The control parameter 216 is received from a processor (e.g., a processor 1102 as described below with reference to FIG. 11-1). In some implementations, each control parameter 216 can correspond to a MIMO preference, an antenna sharing request, a concurrency management command, some combination thereof, and so forth. Examples include first, second, and third control parameters 216-1, 216-2, and 216-3. The first control parameter 216-1 corresponds to a WWAN MIMO request with antenna sharing (e.g., for a 4×4 MIMO as in FIGS. 9-1 and 9-2). The second control parameter 216-2 corresponds to a WLAN MIMO request with antenna sharing (e.g., for a 2×2 MIMO as in FIGS. 9-1 and 9-3). Alternatively, a MIMO request can ask for or authorize a decreased, lower-level MIMO configuration with at least one fewer antenna or signal path of the network 912 (e.g., a 1×1 MIMO configuration for WLAN as in FIG. 9-2 or a 3×3 MIMO configuration for WWAN as in FIG. 9-3). The third control parameter 216-3 corresponds to a concurrency management command (e.g., for sole or shared usage of an antenna coupled to wireless transceiver units for multiple bands such as WWAN and WLAN).

Based on at least one control parameter 216, the switched extractor controller 132 produces the switch control signal 214. The switch control signal 214 is provided to a switched extractor 128, such as the switched extractor 128 of FIGS. 9-1 to 9-3. The switch control signal 214 is indicative of a state of the switched extractor 128. Example states include, for a double-bypass switched extractor 128: a first state— extractor; a second state—bypass for WWAN; and a third state—bypass for WLAN. The first state corresponds to FIG. 9-1, the second state corresponds to FIG. 9-2, and the third state corresponds to FIG. 9-3. The switch control signal 214 can be issued to the switching circuitry 302 (e.g., of FIGS. 3-1, 3-2, and 4) of at least one switched extractor 128.

FIG. 10-2 is a table 1000-2 illustrating example configurations for a switched extractor and corresponding communication scenarios. The top row represents different states of a double-bypass switched extractor over time. Corresponding example WWAN and WLAN configurations are indicated in respective rows below the different states. Other textual portions indicate example scenarios that can precipitate or result from the corresponding extractor states. Some of these example scenarios are described in terms of the MIMO configurations of FIGS. 9-1 to 9-3; however, other device architectures and MIMO configurations may be associated with other scenarios. In a column 1052, the switched extractor state corresponds to an extractor state in which the extractor is used to provide antenna sharing for the WWAN and WLAN communications. Thus, the WWAN communication is operating in a 4×4 MIMO configuration, and the WLAN communication is operating in a 2×2 MIMO configuration. In an example applicable scenario, the associated electronic device can be functioning to provide a Wi-Fi hotspot via a data pipe established over the WWAN communication. Alternatively, the electronic device can be implementing band aggregation across the frequencies assigned to WWAN and WLAN technologies. These scenarios for column 1052 can correspond to those shown in FIG. 9-1.

In a column 1054, the switched extractor state corresponds to a WWAN bypass state. Here, the WWAN communication is operating in a 4×4 MIMO configuration, and there is no current WLAN operation. In an example applicable scenario, the WWAN is using 4 antennas, and the WLAN communication is disabled and is therefore using no antennas. Consequently, the WWAN communication experiences a lowest loss and best performance condition from among those states or conditions that can be established by switching the switched extractor 128 with the architecture of FIGS. 9-1 to 9-3. However, this particular scenario is not explicitly shown in any of the FIGS. 9-1 through 9-3 with respect to the illustrated signal paths because each of these figures includes at least one WLAN signal path being in effect. In a column 1056, the switched extractor state corresponds to a WLAN bypass state. Here, the WLAN communication is operating in a 2×2 MIMO configuration, and there is no current WWAN operation. In an example applicable scenario, the WLAN is using 2 antennas, and the WWAN communication is disabled and is therefore using no antennas. Consequently, the WLAN communication experiences a lowest loss and best performance condition from among those states or conditions that can be established by switching the switched extractor 128 with the architecture of FIGS. 9-1 to 9-3. However, this particular scenario is not explicitly shown in any of the FIGS. 9-1 through 9-3 because each of these figures includes at least one WWAN signal path being in effect.

In a column 1058, the switched extractor state again corresponds to a WWAN bypass state. Here, the WWAN communication is operating in a 4×4 MIMO configuration, and the WLAN communication is operating in a 1×1 MIMO configuration. In an example applicable scenario, the WWAN connection has requested access to the antenna for a band (e.g., B40B) that the extractor can cause an appreciably amount of loss for due to the adjacency, or at least proximity, of relevant frequency ranges. For instance, a WWAN band may at least partially overlap a WLAN band for two communications that might share a concurrent signal path through a switched extractor. Consequently, the switched extractor controller causes the switched extractor to route the signal path over the WWAN bypass path to prioritize the WWAN communication. Further, the WLAN communication is reduced or decreased to the lower 1×1 MIMO configuration because the WWAN communication has a higher priority than the WLAN communication in this scenario, which can correspond to that shown in FIG. 9-2. In a column 1060, the switched extractor state again corresponds to a WLAN bypass state. Here, the WWAN communication and the WLAN communication are both operating in a 2×2 MIMO configuration. In an example applicable scenario, the WLAN communication has requested the antenna that is coupled to the switched extractor to achieve the 2×2 MIMO configuration performance, and the WWAN communication has not requested a 4×4 MIMO configuration or to share the antenna. Thus, the WWAN communication is reduced or decreased to the lower 2×2 MIMO configuration because the WLAN communication has a higher priority than the WWAN communication in this scenario. This scenario is not explicitly shown in any of the FIGS. 9-1 through 9-3, but FIG. 9-3 is similar because the switched extractor 128 is in a bypass-for-WLAN state, with the WLAN communication having a 2×2 MIMO configuration, and the WWAN communication having a 3×3 MIMO configuration.

Figures 1, 11:
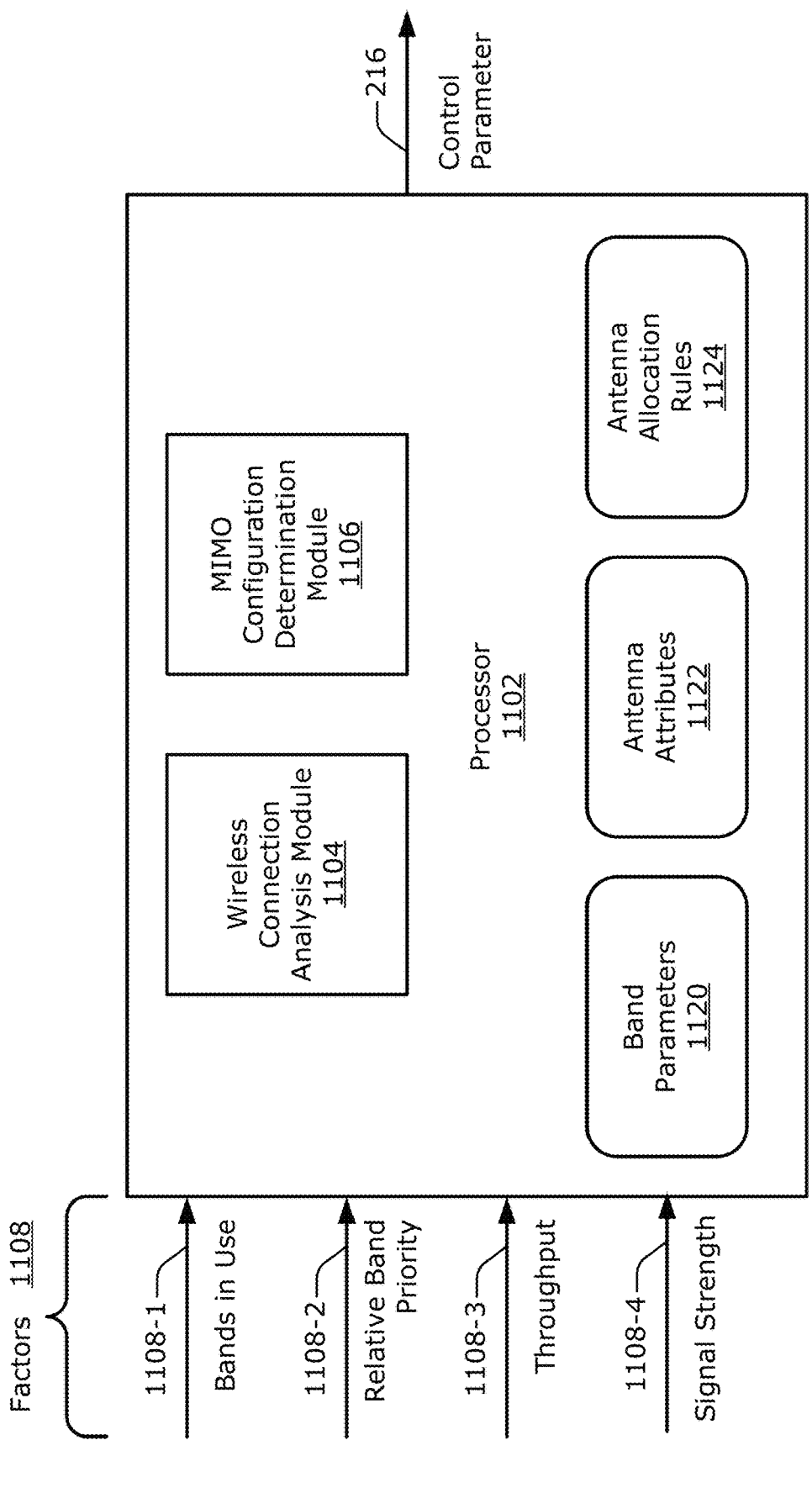
Figures 2, 11:
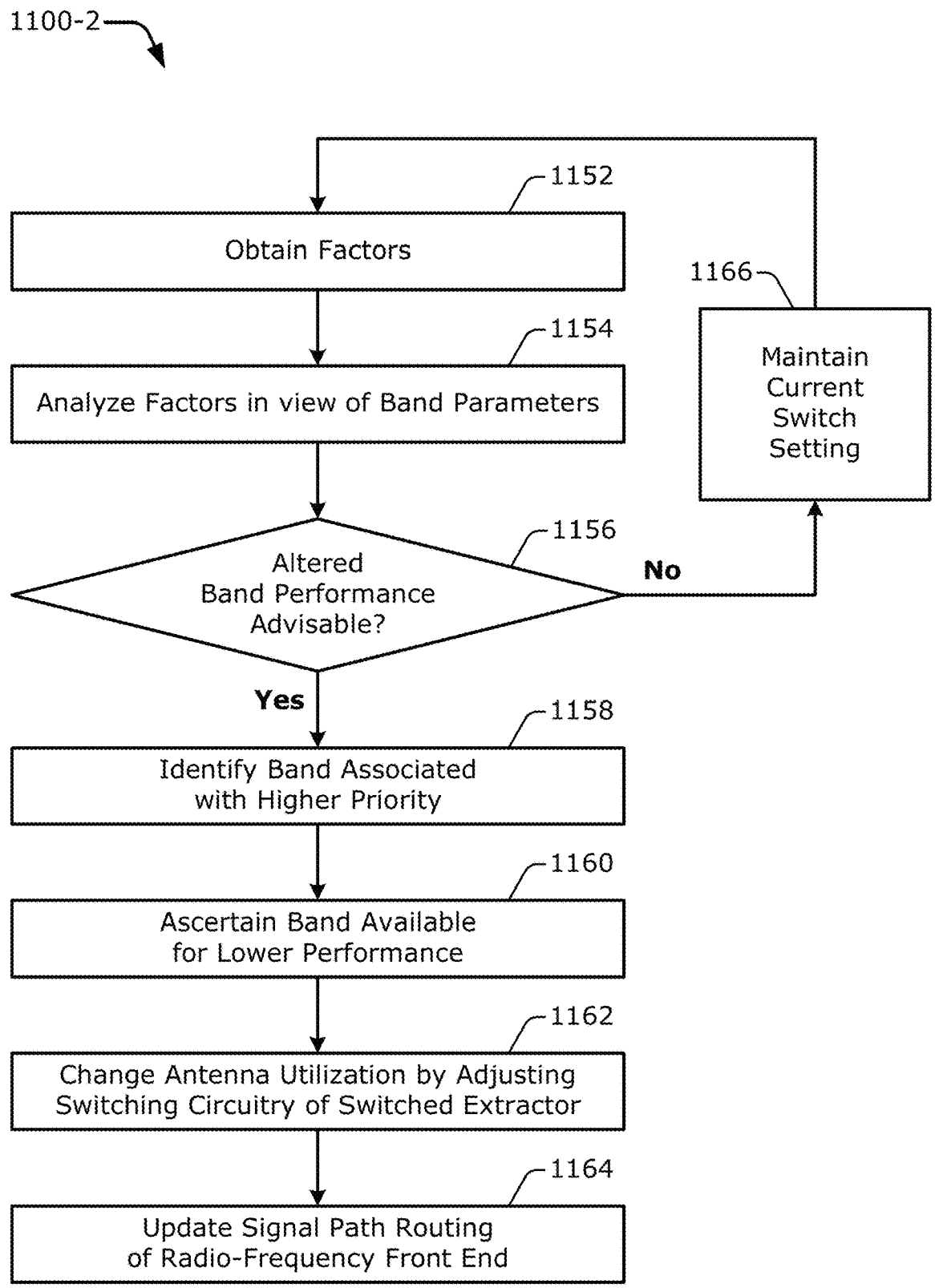

FIG. 11-1 illustrates an example scheme for operating a processor 1102 to facilitate enhanced antenna utilization. The processor 1102 may correspond to, for example, a modem, a digital signal processor (DSP), a controller, an application processor, a multi-core processor, a general-purpose processor, and so forth. The processor 1102 includes multiple modules: a wireless connection analysis module 1104 and a MIMO configuration determination module 1106. The processor 1102 also includes or otherwise has access to one or more band parameters 1120, one or more antenna attributes 1122, and one or more antenna allocation rules 1124. The processor 1102 or the modules thereof may be implemented in software (which is incorporated in or realized using hardware), firmware, hardware, fixed logic circuitry, or combinations thereof. Further, the processor 1102 or the modules thereof may be realized as processor-executable instructions that are stored in memory, hard-coded or deployed via firmware into a specific-purpose processor (e.g., the modem 120 of FIG. 1), executed by a general-purpose processor (e.g., the processor 108 of FIG. 1), some combination thereof, and so forth. Although numerous factors, multiple modules, and different instances of other information are shown in FIG. 11-1 and described herein, a processor 1102 can generate a control parameter 216 with fewer of such inputs or modules or with less information.

The band parameters 1120 can include, for example, a band priority, a corresponding communication technology, a frequency band or range (e.g., a range of frequencies spanned by all or a part of a given frequency band), a standard or specification-defined band, MIMO configuration status, minimum band quality specifications, or current band quality. Band quality can include signal strength, range, throughput, noise rejection, error rate, and so forth. The antenna attributes 1122 can include current usage, appropriate frequencies, tunability, physical location on an electronic device, diversity capability, associated filters or N-plexers, availability of a switched extractor 128 or an extractor 210, available connections to a transceiver unit, and so forth. Antenna allocation rules 1124 can include one or more rules or at least one algorithm that indicates which antennas are to be assigned to which bands based on capabilities, application requests, current priorities, which bands can coexist with other bands in a concurrent path, and so forth.

To produce at least one control parameter 216 that indicates a desired MIMO configuration, the processor 1102 receives one or more factors 1108 as input. These factors 1108 can indicate current statuses, preferences, capabilities, and the like. Example factors 1108 include bands in-use 1108-1, relative band priority 1108-2, current throughput 1108-3, measured signal strength 1108-4, and so forth. The processor 1102 can obtain the factors 1108 from a table, an application (e.g., the operating system), the wireless transceiver 122, by taking a measurement of a signal, and so forth. The wireless connection analysis module 1104 analyzes the factors 1108 in terms of the band parameters 1020 and the antenna attributes 1122. Based on this analysis and the antenna allocation rules 1124, the MIMO configuration determination module 1106 determines a control parameter 216 indicative of a desired MIMO configuration for one or more bands, such as a band for WWAN and a band for WLAN. Example operations for these modules are described further with reference to FIG. 11-2. Although different factors, modules, operations, and so forth are described herein with reference to FIGS. 11-1 and 11-2, a switched extractor 128 can be controlled with less information or fewer components.

FIG. 11-2 is a flow chart illustrating an example approach 1100-2 for implementing enhanced antenna utilization using the processor 1102 of FIG. 11-1. The approach 1100-2 is described in the form of a set of blocks 1152-1166 that specify operations that can be performed. However, operations are not necessarily limited to the order shown in FIG. 11-2 or described herein, for the operations may be implemented in alternative orders or in fully or partially overlapping manners. Also, more, fewer, and/or different operations may be implemented to perform the approach 1100-2, or an alternative approach. For instance, the operation(s) of block 1156 can be performed after the operation(s) of block 1160. Operations represented by the illustrated blocks of the approach 1100-2 may be performed by a processor 1102 or individual modules thereof.

At block 1152, factors are obtained. For example, one or more of the factors 1108 can be obtained. The factors 1108 may include, for example, bands in-use 1108-1 (including sub-bands thereof), relative band priority 1108-2, current throughput 1108-3, measured signal strength 1108-4, link utilization in terms of time or bandwidth, Quality of Service (QoS), interactions with a WWAN base station (e.g. base station requests), interactions with a WLAN access point (e.g., access point link requests), combinations thereof, and so forth. At block 1154, the factors are analyzed in view of one or more band parameters. For example, the factors 1108 can be reviewed to identify relevant ones based on the band parameters 1120. At block 1156, whether an altered or different band performance is advisable is determined. For example, whether utilization of the available antennas can be enhanced by providing a higher-quality wireless communication experience to an end user can be determined. For instance, a current bandwidth for a cellular connection may be resulting in a backlog of cellular data while a current bandwidth for a Wi-Fi connection may be just halfway consumed. If altering the current band performance is not advisable, then at block 1166 the current switch settings for one or more switched extractors are maintained. For example, a current control parameter 216 that is output by the processor 1102 or a current switch control signal 214 that is output by the switched extractor controller 132 can be maintained. After an event or some elapsed time period, the factors to be analyzed can be obtained again at block 1152.

If, on the other hand, the processor determines that altering current band performance is advisable (at block 1156), then at block 1158 a band associated with a higher priority is ascertained. At block 1160, a band associated with a lower priority is ascertained. For example, a cellular connection may be currently tasked with a time-sensitive communication (e.g., real-time navigating and providing data for a Wi-Fi hotspot) while a Wi-Fi connection is tasked with a best-efforts communication (e.g., updating applications for a client device or providing social media updates). Thus, a WWAN band or a GPS band can be associated with a higher priority than a WLAN band in such a situation.

If the two ascertained bands are currently sharing a concurrent signal path, antenna utilization can be enhanced by changing to a bypass signal path in this example. At block 1162, antenna utilization is changed by adjusting switching circuitry of the switched extractor 128. For example, the processor 1102 can issue a control parameter 216 that instructs a switched extractor controller 132 to control a switched extractor 128 to change from a concurrency mode to a bypass mode by adjusting the switch circuitry 302. At block 1164, signal path routing of a radio-frequency front end (RFFE) (e.g., of the network 912) can be updated to accommodate adjustments made to the switched extractor 128. This adjustment of the switched extractor 128 can change one or more MIMO configurations. Thus, a switched-extractor-based scheme, which operates under the direction of the switched extractor controller 132 or the processor 1102, can enable a flexible RFFE to be realized to enhance antenna utilization.

Figure 12:
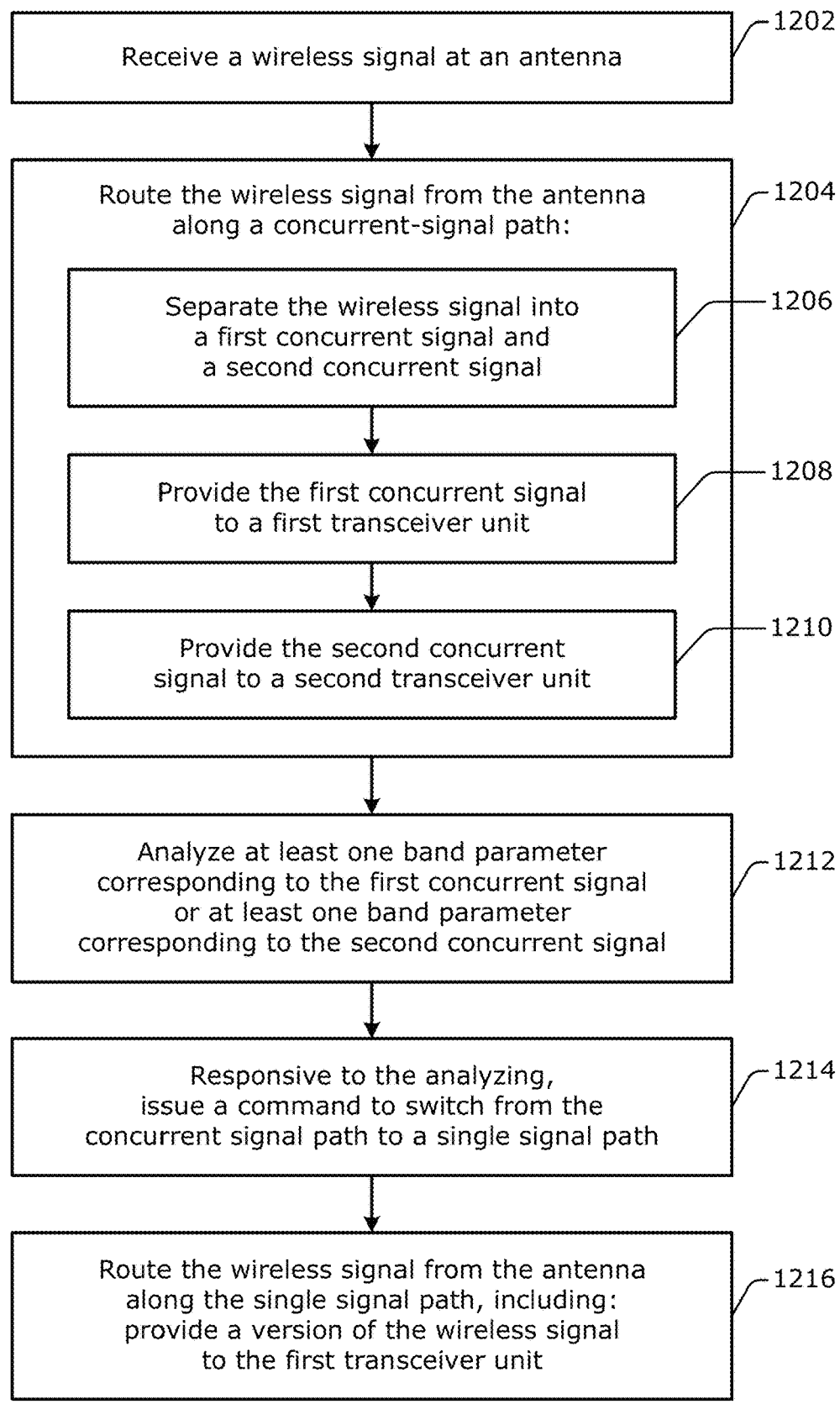
FIG. 12 is a flow diagram illustrating an example process for enhanced antenna utilization.

FIG. 12 is a flow diagram illustrating an example process 1200 for enhancing antenna utilization. The process 1200 is described in the form of a set of blocks 1202-1216 that specify operations that can be performed. However, operations are not necessarily limited to the order shown in FIG. 12 or described herein, for the operations may be implemented in alternative orders or in fully or partially overlapping manners. Also, more, fewer, and/or different operations may be implemented to perform the process 1200, or an alternative process. Operations represented by the illustrated blocks of the process 1200 may be performed by an electronic device 102 or 1402 (of FIG. 14, as described below). More specifically, the operations of the process 1200 may be performed by the components illustrated generally in FIGS. 2-1 and 9-1 to 9-3, and in greater detail in the other FIGS. The operations below are described in terms of receiving a signal, but the operations may also be implemented to enhance antenna utilization while handling a signal being transmitted.

At block 1202, a wireless signal is received at an antenna. For example, a wireless signal 202 can be received at an antenna 130-5. At block 1204, the wireless signal is routed from the antenna along a concurrent signal path. For example, the wireless signal 202 can be routed from the antenna 130-5 through an extractor 210 of a switched extractor 128. The routing includes the operations of blocks 1206-1210. At block 1206, the wireless signal is separated into a first concurrent signal and a second concurrent signal. At block 1208, the first concurrent signal is provided to a first transceiver unit. At block 1210, the second concurrent signal is provided to a second transceiver unit. For example, a network 912 can propagate the first concurrent signal and the second concurrent signal from the extractor 210 of the switched extractor 128 to a first transceiver unit 126-1 and a second transceiver unit 126-5.

At block 1212, at least one band parameter corresponding to the first concurrent signal or at least one band parameter corresponding to the second concurrent signal is analyzed. For example, one or more band parameters 1120 corresponding to the concurrent signals being routed to two different transceiver units can be analyzed. At block 1214, responsive to the analysis, a command to switch from the concurrent signal path to a bypass signal path is issued. The command can be realized as, for example, at least one control parameter 216 (e.g., of FIGS. 2-1 and 11-1) or at least one switch control signal 214 (e.g., of FIGS. 2-1 and 10-1). At block 1216, the wireless signal is routed from the antenna along the bypass signal path, with the single-path routing including providing a version of the wireless signal to the first transceiver unit (e.g., for an implementation that is analogous to that depicted in FIG. 9-2). For example, the wireless signal 202 can be routed from the antenna 130-5 through a first bypass line 212-1 of the switched extractor 128. However, for an implementation in which a change to a bypass mode of the switched extractor 128 is for the second transceiver unit 126-5, the wireless signal 202 can be routed from the antenna 130-5 through a second bypass line 212-2 of the switched extractor 128 (e.g., for an implementation that is analogous to that depicted in FIG. 9-3).

Figure 13:
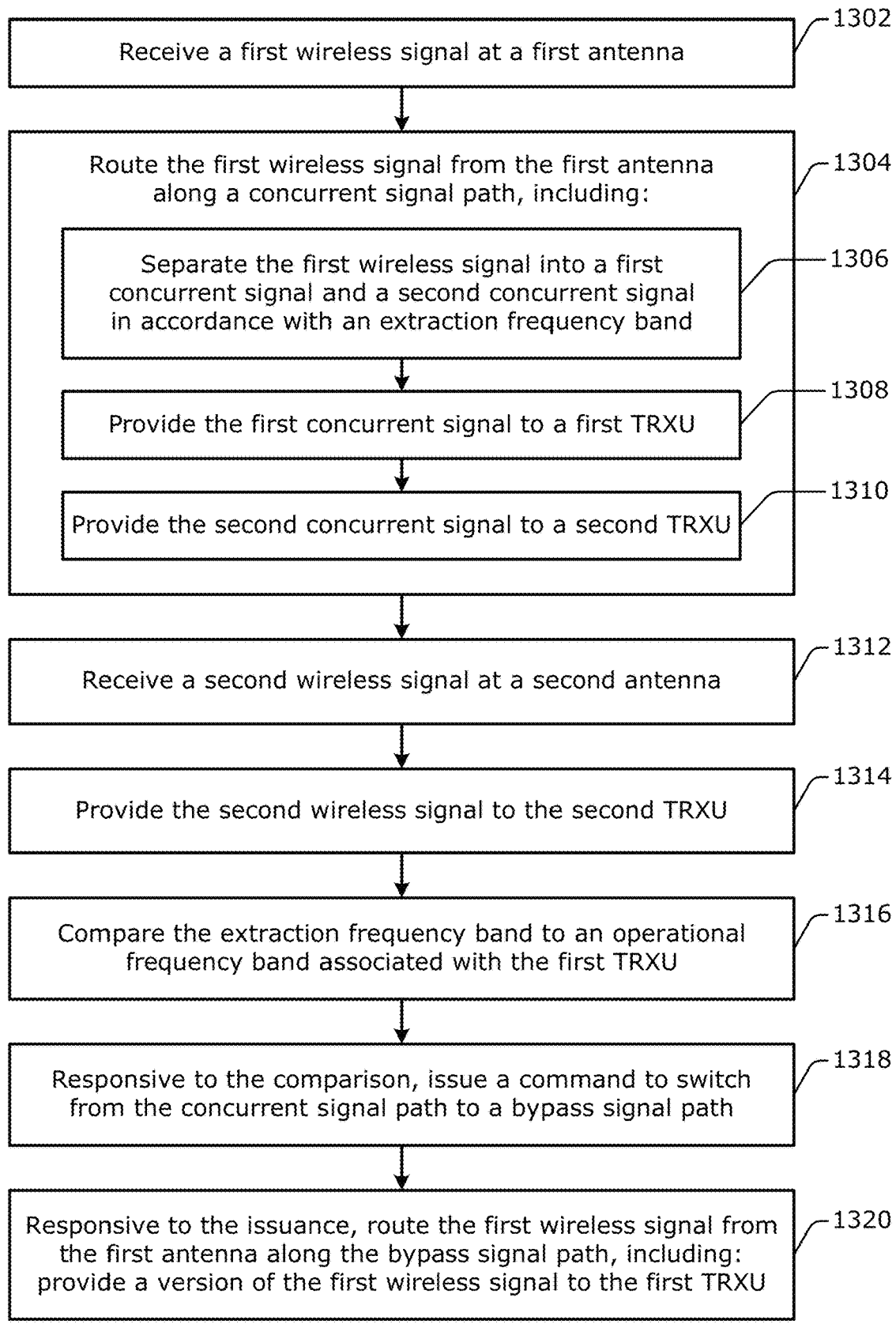
FIG. 13 is a flow diagram illustrating another example process for enhanced antenna utilization.

FIG. 13 is a flow diagram illustrating an example process 1300 for enhancing antenna utilization. The process 1300 is described in the form of a set of blocks 1302-1320 that specify operations that can be performed. However, operations are not necessarily limited to the order shown in FIG. 13 or described herein, for the operations may be implemented in alternative orders or in fully or partially overlapping manners. Also, more, fewer, and/or different operations may be implemented to perform the process 1300, or an alternative process. Operations represented by the illustrated blocks of the process 1300 may be performed by an electronic device 102 or 1402 (of FIG. 14), such as by a radio-frequency front-end (RFFE) in conjunction with at least one antenna 130, a wireless transceiver 122, or a control processor. More specifically, the operations of the process 1300 may be performed by a network 912 that includes at least one switched extractor 128 and by multiple transceiver units (TRXUs).

At block 1302, a first wireless signal is received at a first antenna. For example, an electronic device 102 with wireless communication capabilities can receive a first wireless signal 202 at a first antenna 130-5. The first wireless signal 202 may include a WWAN component, a WLAN component, a GPS component, some combination thereof, and so forth.

At block 1304, the first wireless signal is routed from the first antenna along a concurrent signal path. For example, the electronic device 102 can route the first wireless signal 202 from the first antenna 130-5 along a concurrent signal path that includes a switched extractor 128. For instance, the switched extractor 128 may route the first wireless signal 202 along a concurrent signal path 502-1 that includes an extractor 210 for a concurrency mode. This can form part of a pair of overlapping signal paths—e.g., a signal path 908-4 and a signal path 910-2—along a network 912. In some implementations, the routing of block 1304 can include blocks 1306-1310.

At block 1306, the first wireless signal is separated into a first concurrent signal and a second concurrent signal in accordance with an extraction frequency band. For example, one or more filters of the extractor 210 can separate the first wireless signal 202 into a first concurrent signal and a second concurrent signal in accordance with an extraction frequency band. The first concurrent signal can be propagated along a first concurrent signal path 502-1a, and the second concurrent signal can be propagated along a second concurrent signal path 502-1b. In some cases, the one or more filters of the extractor 210 may reject at least one extraction frequency band using a band-rejection filter 310 to produce the first concurrent signal and may pass at least one extraction frequency band using a bandpass filter 312 to produce the second concurrent signal.

At block 1308, the first concurrent signal is provided to a first transceiver unit. For example, the network 912 can propagate the first concurrent signal to a first transceiver unit 126-1 (TRX Unit or TRXU 126-1) through a first filter 222-1 of the extractor 210 along the signal path 908-4. At block 1310, the second concurrent signal is provided to a second transceiver unit. For example, the network 912 can propagate the second concurrent signal to a second transceiver unit 126-5 through a second filter 222-2 of the extractor 210 along the signal path 910-2. This may correspond to an extractor state, such as the one depicted in column 1052 of FIG. 10-2.

At block 1312, a second wireless signal is received at a second antenna. For example, an electronic device 102 can receive a second wireless signal 202 at a second antenna 130-4. The second wireless signal 202 may include a WWAN component, a WLAN component, a GPS component, some combination thereof, and so forth. At block 1314, the second wireless signal is provided to the second transceiver unit. For example, the electronic device 102 can route the second wireless signal 202 from the second antenna 130-4 to the second transceiver unit 126-5 along a signal path 910-1. With reference to FIG. 9-1, the first transceiver unit 126-1 is utilizing a 4×4 MIMO configuration using antennas 130-5, 130-3, 130-2, and 130-1. Due at least partially to the concurrent mode, the second transceiver unit 126-5 is utilizing a 2×2 MIMO configuration using antennas 130-5 and 130-4.

At block 1316, the extraction frequency band is compared to an operational frequency band associated with the first transceiver unit. For example, at least one processer can compare the extraction frequency band to an operational frequency band associated with the first transceiver unit 126-1. To do so, the extraction frequency band corresponding to the extractor 210 may be compared to a frequency range of a band that is currently being used for communication operations by the first transceiver unit 126-1, such as a WWAN band, including an LTE band (e.g., Band 40 or B40). The comparison may determine whether the extraction frequency band is proximate to the operational frequency band (e.g., is sufficiently close that interference or filtering may cause cross-attenuation or other signal degradation). In some cases, proximate bands may comprise, for example, different bands that are adjacent to each other, that are at least partially overlapping with each other (e.g., literally or effectively overlapping), that are sufficiently close such that at least a skirt of a filter applied for one band can impact signals in the other band, or some combination thereof.

Generally, proximate bands may comprise different bands that cannot feasibly be separated from each other using filters without a filter for one band impacting signals for another band, or vice versa. Two bands can be adjacent to each other if the two bands are, for instance, separated by only a guard band. Additionally, two bands can be literally at least partially overlapping if a frequency in one band is also present in the other band. Alternatively, two bands can be effectively at least partially overlapping if one or more filters cannot be employed to separate the two bands without filtering in one impacting signals in the other. Thus, two bands can be effectively at least partially overlapping regardless of whether the two bands are adjacent to each other. In a specific example, the 2.4 GHz band of Wi-Fi for WLAN communications is adjacent to the B40 band of LTE for WWAN communications. Only one (1) MHz separates these two bands. In the context of 2400 MHz, 1 MHz between first and second bands results in two bands that are effectively at least partially overlapping because bandpass filters and band-rejection filters cannot be built with filter skirts that span less than the 1 MHz that separates the two bands.

If two bands are proximate, including at least partially overlapping, a comparison or associated analysis may further determine if a portion of a first band that is currently in-use overlaps a second band. For example, a first band, such as a WWAN band (e.g., B40), may include a first portion and a second portion, such as an "A" portion and a "B" portion. Here, the "A" portion of the first band is proximate to the second band, such as a WLAN band, but the "B" portion of the first band is not proximate to the second band (e.g., the "A" portion of the first band is between the "B" portion of the first band and the second band). In this case, the comparison can determine if the "A" portion of the first band is in-use. If the "A" portion of the first band is in use (regardless of whether the "B" portion is in-use), the first and second bands can be considered to be proximate in a relevant, potentially-interfering manner (e.g., can be effectively at least partially overlapping). On the other hand, if the "B" portion of the first band is in-use (but not the "A" portion), the first and second bands can be considered to be non-proximate in this instance.

Further, if an electronic device wishes to use a concurrent mode of a switched extractor, the electronic device can selectively employ, or ask a WWAN manager to be assigned, the "B" portion of the first band. In a specific example, the first band can comprise band B40 with "A" and "B" portions, the second band can comprise a 2.4 GHz Wi-Fi band, and the "A" portion can be adjacent to the second band. If the "A" portion of the first band is in-use, then signals are routed through a bypass line of a switched extractor for a bypass signal path, and the Wi-Fi transceiver unit operates in a "lower" MIMO configuration. For this bypass mode, the signals are routed through a B40-tuned filter. This B40-tuned filter can be disposed along the bypass line of the switched extractor or elsewhere between the antenna coupled to the switched extractor and the WWAN transceiver unit. On the other hand, if the "B" portion of the first band is in-use, then signals are routed through an extractor of the switched extractor for a concurrent signal path. With the concurrent mode, both the WWAN transceiver unit and the Wi-Fi transceiver unit utilize the antenna coupled to the switched extractor, and both can operate with a "higher" MIMO configuration level. In these manners, a determination of whether a concurrent mode or a bypass mode is to be utilized can be further based on which portion of at least one band currently corresponds to an operational frequency band associated with a transceiver unit.

At block 1318, responsive to the comparing, a command is issued to switch from the concurrent signal path to a bypass signal path. For example, responsive to the comparing, at least one processor can issue a command to switch from the concurrent signal path 502-1 to a bypass signal path 502-2. To do so, a processor 108, a modem 120, or a switched extractor controller 132 may issue a switch control signal 214 or a control parameter 216 that causes the switched extractor 128 to change from a concurrent state to a bypass state. For instance, the switched extractor 128 may switch from routing a signal through the extractor 210 to routing the signal through a bypass line 212, such as a first bypass line 212-1.

At block 1320, responsive to the issuing, the first wireless signal is routed from the first antenna along the bypass signal path, including by providing a version of the first wireless signal to the first transceiver unit. For example, responsive to the issuing, the network 912 can route the first wireless signal 202 from the first antenna 130-5 along the bypass signal path 502-2, including by providing a version of the first wireless signal 202 to the first transceiver unit 126-1. To do so, the switched extractor 128 can adjust the switching circuitry 302 (e.g., at least a first switch 402-1 and a second switch 402-2) to establish a signaling path 908-4. This effectively reduces or decreases a MIMO configuration corresponding to the second transceiver unit 126-5 by a 1×1 level while maintaining the 4×4 MIMO configuration of the first transceiver unit 126-1. Thus, if the second transceiver unit 126-5 operated with a 2×2 MIMO configuration during the concurrent mode of the switched extractor 128, the second transceiver unit 126-5 is reduced or lowered to a 1×1 MIMO configuration for the bypass mode of the switched extractor 128 that favors wireless communications with the first transceiver unit 126-1.

Figure 14:
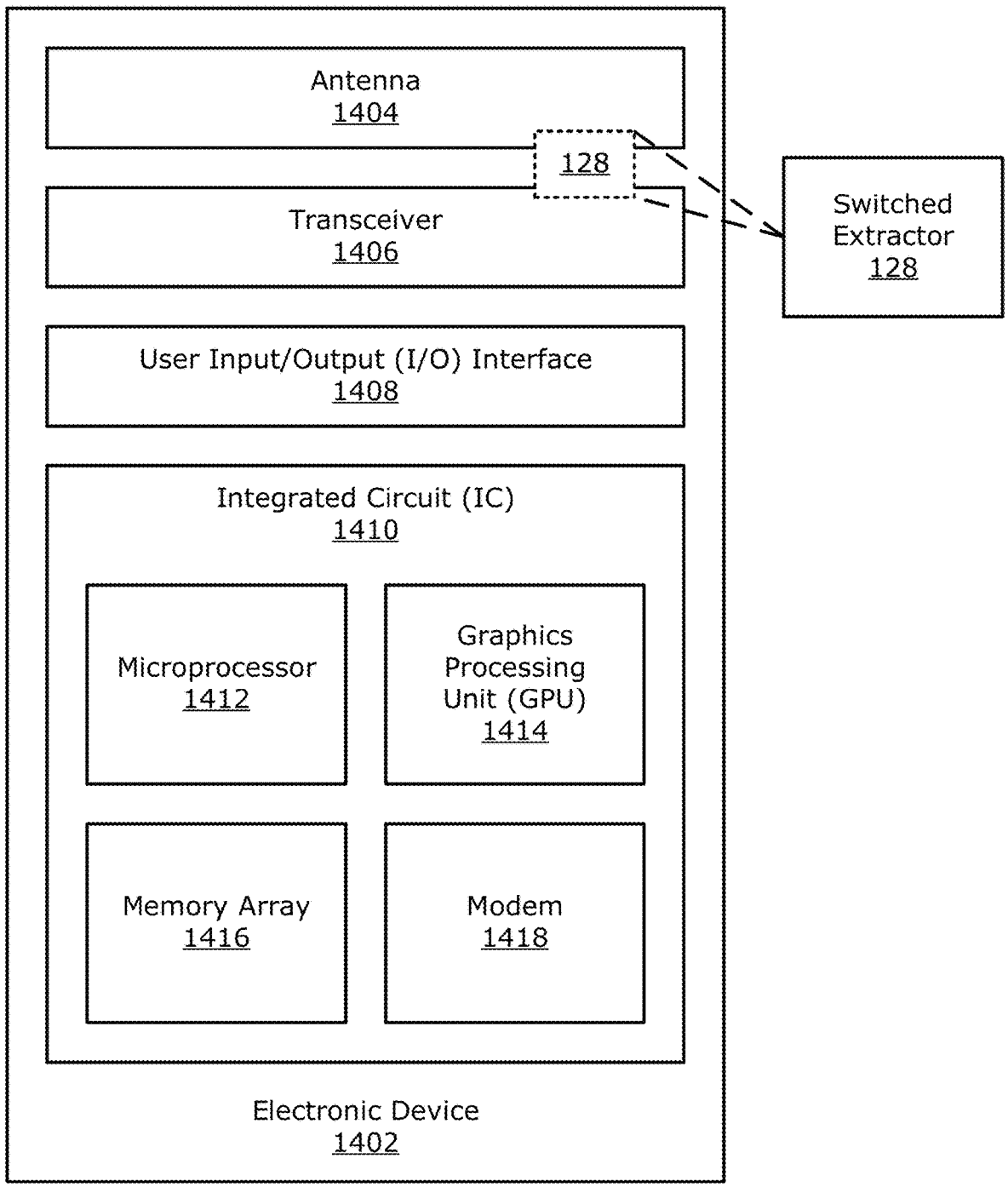
FIG. 14 illustrates an example electronic device, which includes a switched extractor, that can implement enhanced antenna utilization.

FIG. 14 illustrates an example electronic device 1402, which includes an integrated circuit 1410 (IC), that can implement enhanced antenna utilization. As shown, the electronic device 1402 includes an antenna 1404, a transceiver 1406, and a user input/output (I/O) interface 1408, in addition to the integrated circuit 1410. Illustrated examples of the integrated circuit 1410, or cores thereof, include a microprocessor 1412, a graphics processing unit (GPU) 1414, a memory array 1416, and a modem 1418. Each component can be operably coupled to another component, such as the GPU 1414 being operably coupled to the user I/O interface 1408. In one or more example implementations, a switched extractor 128 as described herein can be implemented between the antenna 1404 and the transceiver 1406 so that an incoming signal can be selectably routed unchanged or as multiple concurrent portions of the incoming signal.

The electronic device 1402 can be a mobile or battery-powered device or a fixed device that is designed to be powered by an electrical grid. Examples of the electronic device 1402 include a server computer, a network switch or router, a blade of a data center, a personal computer, a desktop computer, a notebook or laptop computer, a tablet computer, a smart phone, an entertainment appliance, or a wearable electronic device such as a smartwatch, intelligent glasses, or an article of clothing. An electronic device 1402 can also be a device, or a portion thereof, having embedded electronics. Examples of the electronic device 1402 with embedded electronics include a passenger vehicle, industrial equipment, a refrigerator or other home appliance, a drone or other unmanned aerial vehicle (UAV), or a power tool.

For an electronic device with a wireless capability, the electronic device 1402 includes an antenna 1404 that is coupled to a transceiver 1406 to enable reception or transmission of one or more wireless signals. The integrated circuit 1410 may be coupled to the transceiver 1406 to enable the integrated circuit 1410 to have access to received wireless signals or to provide wireless signals for transmission via the antenna 1404. The electronic device 1402 as shown also includes at least one user I/O interface 1408. Examples of the user I/O interface 1408 include a keyboard, a mouse, a microphone, a touch-sensitive screen, a camera, an accelerometer, a haptic mechanism, a speaker, a display screen, or a projector. The transceiver 1406 can correspond to, for example, the wireless transceiver 122 (e.g., of FIGS. 1 and 2-1) that is coupled to a switched extractor 128 as described herein.

The integrated circuit 1410 may comprise, for example, one or more instances of a microprocessor 1412, a GPU 1414, a memory array 1416, a modem 1418, and so forth. The microprocessor 1412 may function as a central processing unit (CPU) or other general-purpose processor. Some microprocessors include different parts, such as multiple processing cores, that may be individually powered on or off. The GPU 1414 may be especially adapted to process visual-related data for display, such as video data images. If visual-related data is not being rendered or otherwise processed, the GPU 1414 may be fully or partially powered down. The memory array 1416 stores data for the microprocessor 1412 or the GPU 1414. Example types of memory for the memory array 1416 include random access memory (RAM), such as dynamic RAM (DRAM) or static RAM (SRAM); flash memory; and so forth. If programs are not accessing data stored in memory, the memory array 1416 may be powered down overall or block-by-block. The modem 1418 demodulates a signal to extract encoded information or modulates a signal to encode information into the signal. If there is no information to decode from an inbound communication or to encode for an outbound communication, the modem 1418 may be idled to reduce power consumption. The integrated circuit 1410 may include additional or alternative parts than those that are shown, such as an I/O interface, a sensor such as an accelerometer, a transceiver or another part of a receiver chain, a customized or hard-coded processor such as an application-specific integrated circuit (ASIC), and so forth.

The integrated circuit 1410 may also comprise a system-on-chip (SoC). An SoC may integrate a sufficient number of different types of components to enable the SoC to provide computational functionality as a notebook computer, a mobile phone, or another electronic apparatus using one chip, at least primarily. Components of an SoC, or an integrated circuit 1410 generally, may be termed cores or circuit blocks. Examples of cores or circuit blocks include, in addition to those that are illustrated in FIG. 14, a voltage regulator, a main memory or cache memory block, a memory controller, a general-purpose processor, a cryptographic processor, a video or image processor, a vector processor, a radio, an interface or communications subsystem, a wireless controller, or a display controller. Any of these cores or circuit blocks, such as a central processing unit or a multimedia processor, may further include multiple internal cores or circuit blocks.

Multiple additional example implementations are described below. Each may be realized in accordance with the description above or the referenced figures. Although each example implementation is described in relation to a particular set of characteristics, other implementations may have more, fewer, or different characteristics. Further, the example implementations described below may be combined with other implementations described herein.

For an example implementation #1, an apparatus includes a switched extractor. The switched extractor includes a port, a first port, a second port, and a bypass line. The switched extractor also includes an extractor and switching circuitry. The extractor includes multiple filters. The extractor is configured to extract a frequency band and output a first separated signal and a second separated signal, with the first separated signal suppressing the extracted frequency band and the second separated signal including the extracted frequency band. The switching circuitry is configured to selectably establish a bypass signal path or a concurrent signal path between the port and the first and second ports, with the bypass signal path including the bypass line, and the concurrent signal path including the extractor.

For an example implementation #2, an apparatus incorporates the aspects of example #1, wherein: the multiple filters of the extractor include a first filter and a second filter; the first filter comprises a band-rejection filter corresponding to the frequency band; and the second filter comprises a bandpass filter corresponding to the frequency band. For an example implementation #3, an apparatus incorporates the aspects of example #2, wherein at least one of the first filter or the second filter comprises an electro-acoustic component.

For an example implementation #4, an apparatus incorporates the aspects of example #1, wherein: the frequency band comprises a first frequency band and a second frequency band; the extractor is configured to extract the first frequency band and the second frequency band, with the extractor configured to output the first separated signal, the second separated signal, and a third separated signal; the multiple filters of the extractor include a first filter, a second filter, and a third filter; the first filter comprises a multiple band-rejection filter corresponding to the first frequency band and the second frequency band; the second filter comprises a first bandpass filter corresponding to the first frequency band; and the third filter comprises a second bandpass filter corresponding to the second frequency band.

For an example implementation #5, an apparatus incorporates the aspects of example #1, wherein: the switched extractor further includes a third port; the bypass line comprises a first bypass line and a second bypass line; the bypass signal path comprises a first bypass signal path and a second bypass signal path; and the switching circuitry is configured to selectably establish the first bypass signal path, the second bypass signal path, or the concurrent signal path between the port and the first, second, and third ports. Here, the first bypass signal path includes the first bypass line, the second bypass signal path includes the second bypass line, and the concurrent signal path includes the extractor. For an example implementation #6, an apparatus incorporates the aspects of example #1, wherein the bypass line comprises at least one filter.

For an example implementation #7, an apparatus incorporates the aspects of example #1, wherein the first port corresponds to a first band, and the second port corresponds to a second band. Further, the switching circuitry is configured to selectably establish the bypass signal path for the first band such that a version of an input signal accepted at the port is propagated to the first port via the bypass line. For an example implementation #8, an apparatus incorporates the aspects of example #7, wherein the multiple filters of the extractor include a first filter and a second filter. Further, the switching circuitry is configured to selectably establish the concurrent signal path for: the first band such that a first version of the input signal is propagated to the first port via the first filter of the extractor; and the second band such that a second version of the input signal is propagated to the second port via the second filter of the extractor.

For an example implementation #9, an apparatus incorporates the aspects of example #8, wherein: the first band corresponds to a first frequency range; and the second band corresponds to a second frequency range. For an example implementation #10, an apparatus incorporates the aspects of example 8, wherein: the first band corresponds to a cellular or wireless wide area network (WWAN) technology; and the second band corresponds to at least on of: (i) a Wi-Fi or wireless local area network (WLAN) technology, (ii) a navigational or Global Positioning System (GPS) technology, or (iii) another cellular or WWAN technology.

For an example implementation #11, an apparatus incorporates the aspects of example #1, wherein: the switching circuitry comprises a first switch and a second switch; the first switch is coupled between (i) the port and (ii) the extractor and the bypass line; and the second switch is coupled between (i) the extractor and the bypass line and (ii) the first port. For an example implementation #12, an apparatus incorporates the aspects of example #11, and the apparatus further comprises: an antenna tuner switch and an antenna switch matrix. Here, the antenna tuner switch comprises the first switch, and the antenna switch matrix comprises the second switch. For an example implementation #13, an apparatus incorporates the aspects of example #11, and the apparatus further comprises a micro-acoustic package including a separator electro-acoustic chip and a switch integrated circuit chip, with the semiconductor package including the port, the first port, and the second port. Here, the separator integrated circuit chip comprises the extractor, and the switch integrated circuit chip comprises the first switch and the second switch. For an example implementation #14, an apparatus incorporates the aspects of example #11, and the apparatus further comprises: a micro-acoustic package including a separator electro-acoustic chip comprising the extractor; and at least one other semiconductor package including at least one switch integrated circuit chip, with the at least one switch integrated circuit chip including at least one of the first switch or the second switch.

For an example implementation #15, an apparatus incorporates the aspects of example #1, and the apparatus further comprises: an antenna coupled to the port of the switched extractor, with the first port corresponding to a first band, and the second port corresponding to a second band. For an example implementation #16, an apparatus incorporates the aspects of example #15, and the apparatus further comprises a wireless transceiver including a first transceiver unit and a second transceiver unit. Here, the first port is coupled to the first transceiver unit, and the second port is coupled to the second transceiver unit.

For an example implementation #17, an apparatus incorporates the aspects of example #16, wherein: the bypass signal path corresponds to a bypass mode for the switched extractor, and the concurrent signal path corresponds to a concurrency mode for the switched extractor. Further, the switching circuitry is configured to enable the first band for the first transceiver unit and to disable the second band for the second transceiver unit responsive to activation of the bypass mode. Additionally, the switching circuitry is configured to enable the first band for the first transceiver unit and to enable the second band for the second transceiver unit responsive to activation of the concurrency mode. For an example implementation #18, an apparatus incorporates the aspects of example #17, wherein the switching circuitry is configured to downshift (e.g., reduce a level of) a multiple-input, multiple-output (MIMO) configuration by decreasing a quantity of antennas or internal signal paths allocated for the second band based on switching from the concurrency mode to the bypass mode.

For an example implementation #19, an apparatus incorporates the aspects of example #15, and the apparatus further comprises a switched extractor controller configured to provide a switch control signal to the switching circuitry of the switched extractor. The switched extractor controller is configured to generate the switch control signal responsive to at least one first band parameter associated with the first band or at least one second band parameter associated with the second band. For an example implementation #20, an apparatus incorporates the aspects of example #19, wherein: the at least one first band parameter comprises a first frequency range of the first band; and the at least one second band parameter comprises a second frequency range of the second band.

For an example implementation #21, an apparatus incorporates the aspects of example #19, wherein: the at least one first band parameter comprises a first priority of the first band; and the at least one second band parameter comprises a second priority of the second band. For an example implementation #22, an apparatus incorporates the aspects of example #19, wherein the at least one first band parameter comprises a band assignment that comports with a Long-Term Evolution (LTE) standard. For an example implementation #23, an apparatus incorporates the aspects of example #19, wherein the at least one first band parameter comprises a signal quality of the first band. For an example implementation #24, an apparatus incorporates the aspects of example #23, wherein the signal quality of the first band comprises at least one of signal strength, signal-to-noise ratio, error rate, throughput, or range.

For an example implementation #25, an apparatus incorporates the aspects of example #1, wherein: the port comprises an antenna-side port; the first port comprises a first transceiver-side port; and the second port comprises a second transceiver-side port. For an example implementation #26, an apparatus incorporates the aspects of example #25, wherein the switching circuitry is configured to selectably: establish the bypass signal path between the antenna-side port and either the first transceiver side port or the second transceiver side port; or establish the concurrent signal path between the antenna side port and both the first transceiver side port and the second transceiver-side port simultaneously. For an example implementation #27, an apparatus incorporates the aspects of example #26, wherein the bypass signal path comprises a first bypass signal path and a second bypass signal path. Further, the switching circuitry is configured to selectably establish the first bypass signal path between the antenna-side port and the first transceiver side port at a first time or the second bypass signal path between the antenna-side port and the second transceiver side port at a second time.

For an example implementation #28, an apparatus includes a switched extractor. The switched extractor includes a port, a first port, a second port, and a bypass line.

The switched extractor also includes an extractor having multiple filters. The extractor is configured to extract a frequency band and output a first separated signal and a second separated signal. The first separated signal suppresses the extracted frequency band, and the second separated signal includes the extracted frequency band. The switched extractor also includes switch means for selectably establishing a bypass signal path or a concurrent signal path between the port and the first and second ports, with the bypass signal path including the bypass line, and the concurrent signal path including the extractor. For an example implementation #29, an apparatus incorporates the aspects of example #28, and the apparatus further comprises control means for controlling the switch means based on one or more band parameters.

For an example implementation #30, a method for enhancing antenna utilization includes receiving a wireless signal at an antenna and routing the wireless signal from the antenna along a concurrent signal path. The routing includes: separating the wireless signal into a first concurrent signal and a second concurrent signal; providing the first concurrent signal to a first transceiver unit; and providing the second concurrent signal to a second transceiver unit. The method also includes analyzing at least one band parameter corresponding to the first concurrent signal or at least one band parameter corresponding to the second concurrent signal. The method additionally includes, responsive to the analyzing, issuing a command to switch from the concurrent signal path to a bypass signal path. The method further includes routing the wireless signal from the antenna along the bypass signal path, including providing a version of the wireless signal to the first transceiver unit.

For an example implementation #31, a method incorporates the aspects of example #30, wherein the separating of the wireless signal into a first concurrent signal and a second concurrent signal comprises: applying the wireless signal to a first filter to produce the first concurrent signal; and applying the wireless signal to a second filter to produce the second concurrent signal. For an example implementation #32, a method incorporates the aspects of example #30, wherein the routing of the wireless signal from the antenna along the bypass signal path comprises diverting the wireless signal over a bypass line that includes at least one filter. For an example implementation #33, a method incorporates the aspects of example #30, wherein the analyzing comprises comparing a Long-Term Evolution (LTE) band associated with the wireless signal to a predetermined LTE band. For an example implementation #34, a method incorporates the aspects of example #30, and the method further comprises, responsive to the issuing, adjusting at least one switch to downshift or lower a level of a multiple-input, multiple-output (MIMO) configuration corresponding to the second transceiver unit.

For an example implementation #35, a switched extractor includes a port, at least one port, and a bypass line. The switched extractor also includes an extractor and switching circuitry. The extractor includes a first filter and a second filter, with the first filter corresponding to a first band, and the second filter corresponding to a second band. The switching circuitry is coupled to the port and the at least one port, with the switching circuitry configured to selectably connect the port to the at least one port via the bypass line or via the first filter of the extractor.

For an example implementation #36, a switched extractor incorporates the aspects of example #35, wherein the at least one port includes a first port and a second port. Further, the switching circuitry is configured to selectably connect the port to the first port via the bypass line or via the first filter of the extractor; and the switching circuitry is also configured to selectably connect the port to the second port via the second filter of the extractor responsive to connection of the port to the first port via the first filter of the extractor.

For an example implementation #37, a switched extractor incorporates the aspects of example #36, and the switched extractor further comprises a switched extractor that includes the extractor, wherein the port, the first port, and the second port each comprise a port of the switched extractor; and the switching circuitry includes a first switch and a second switch. Additionally, the first switch includes a switch port, a first switch port, and a second switch port; and the second switch includes a first switch port, a second switch port, and a switch port. The port of the switched extractor is coupled to the switch port of the first switch. Also, the first switch port of the first switch is coupled to the first switch port of the second switch, and the second switch port of the first switch is coupled to a port of the extractor. Further, a port of the first filter of the extractor is coupled to the second switch port of the second switch, and a port of the second filter of the extractor is coupled to the second port of the switched extractor. The switch port of the second switch is coupled to the first port of the switched extractor.

For an example implementation #38, a switched extractor incorporates the aspects of example #35, and the switched extractor further comprises another bypass line, wherein the at least one port includes a first port and a second port. Here, the switching circuitry is configured to selectably connect the port to the first port via the bypass line and to disconnect the port from the second port. The switching circuitry is also configured to selectably connect the port to the first port via the first filter of the extractor concurrently with connecting the port to the second port via the second filter of the extractor. The switching circuitry is further configured to selectably connect the port to the second port via the other bypass line and to disconnect the port from the first port.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. A method for operating a wireless communication apparatus that includes:
   a switched extractor coupled to a first antenna, the switched extractor including:
      an extractor having multiple filters, the extractor configured to extract an extraction frequency band using the multiple filters, the multiple filters including a band-rejection filter and a bandpass filter, the band-rejection filter configured to suppress frequencies within the extraction frequency band and pass frequencies on each side of the extraction frequency band, the bandpass filter configured to pass frequencies within the extraction frequency band;
a bypass line; and
switching circuitry coupled to the extractor and the bypass line, the switching circuitry configured to selectively establish a bypass signal path including the bypass line or a concurrent signal path including the extractor, the method comprising:
causing the switching circuitry to selectively connect a first transceiver unit configured to communicate via a wireless wide area network (WWAN) to the first antenna via the bypass signal path instead of via the concurrent signal path based on an operational frequency band associated with the first transceiver unit corresponding to a WWAN band being adjacent to or at least partially overlapping with a wireless local area network (WLAN) band associated with a second transceiver unit configured to communicate via a wireless local area network (WLAN) via the first antenna or a second antenna.

2. The method of claim 1, wherein:
the operational frequency band associated with the first transceiver unit comprises a band assignment that comports with a Long-Term Evolution (LTE) standard; and
the extraction frequency band corresponds to another operational frequency band associated with the second transceiver unit.

3. The method of claim 1, further comprising, responsive to the causing:
decreasing a first quantity of antennas of a first multiple-input, multiple-output (MIMO) configuration corresponding to the second transceiver unit.

4. The method of claim 1, further comprising:
disconnecting the second transceiver unit from the first antenna responsive to connection of the first transceiver unit to the first antenna via the bypass signal path.

5. The method of claim 1, wherein:
the switched extractor includes another bypass line; and
the switching circuitry is coupled to the other bypass line that bypasses the extractor, the method further comprising:
causing the switching circuitry to selectively connect the second transceiver unit to the first antenna via the bypass signal path or via the concurrent signal path.

6. The method of claim 1, further comprising:
actively communicating via the WWAN using the first antenna; and
actively communicating via the WLAN using the second antenna in an operating mode based on the operational frequency band being adjacent to or at least partially overlapping with the WLAN band.

7. The method of claim 1, wherein the operational frequency band being adjacent to or at least partially overlapping with the WLAN band corresponds to a first operation mode, and wherein the method further comprises:
causing the switching circuitry to establish a concurrent mode of the switched extractor by connecting the first transceiver unit and the second transceiver unit to the first antenna via the concurrent signal path;
actively communicating via the WWAN using the first antenna for the concurrent mode of the switched extractor; and
actively communicating via the WLAN using the first antenna for the concurrent mode of the switched extractor.

8. The method of claim 1, wherein the operational frequency band being adjacent to or at least partially overlapping with the WLAN band corresponds to a first operation mode, and wherein the method further comprises:
establishing a concurrent mode using the concurrent signal path at a first time; communicating, using a first portion of multiple transceiver units including the first transceiver unit, via the WWAN using a first multiple-input, multiple-output (MIMO) configuration at the first time; and
communicating, using a second portion of the multiple transceiver units including the second transceiver unit, via the WLAN using a second MIMO configuration at the first time.

9. The method of claim 1, further comprising:
communicating, using a first portion of multiple transceiver units including the first transceiver unit, via the WWAN using a first multiple-input, multiple-output (MIMO) configuration at a first time; and
communicating, using a second portion of the multiple transceiver units including the second transceiver unit, via the WLAN using a second MIMO configuration at the first time, the second MIMO configuration comprising at least one fewer antenna than the first MIMO configuration.

10. The method of claim 1, wherein the first transceiver unit is coupled to the band-rejection filter.

11. The method of claim 1, wherein the bypass line comprises at least one filter.

12. A method for operating a wireless communication apparatus, the method comprising:
determining that an operational frequency band corresponding to a wireless wide area network (WWAN) band associated with a first transceiver unit is adjacent to or at least partially overlapping with a wireless local area network (WLAN) band associated with a second transceiver unit; and
routing a signal received via a first antenna to the first transceiver unit via a bypass path that bypasses an extractor instead of via a concurrent signal path that includes the extractor in response to determining that the operational frequency band is adjacent to or at least partially overlapping with the WLAN band, the extractor having multiple filters and configured to extract an extraction frequency band using the multiple filters, the multiple filters including a band-rejection filter and a bandpass filter, the band-rejection filter configured to suppress frequencies within the extraction frequency band and pass frequencies on each side of the extraction frequency band, the bandpass filter configured to pass frequencies within the extraction frequency band.

13. The method of claim 12, further comprising, responsive to the determining:
decreasing a first quantity of antennas of a first multiple-input, multiple-output (MIMO) configuration corresponding to the second transceiver unit.

14. The method of claim 12, wherein the operational frequency band being adjacent to or at least partially overlapping with the WLAN band corresponds to a first operation mode, and wherein in a second operation mode the method further comprises:
routing the signal to the first transceiver unit and the second transceiver unit via the extractor;
actively communicating via a WWAN using the first antenna; and
actively communicating via a WLAN using the first antenna.

15. The method of claim 12, wherein the operational frequency band being adjacent to or at least partially overlapping with the WLAN band corresponds to a first operation mode, and wherein in a second operation mode the method further comprises:

routing the signal to the first transceiver unit via the extractor at a first time;

communicating, using a first portion of multiple transceiver units including the first transceiver unit, via a WWAN using a first multiple-input, multiple-output (MIMO) configuration at the first time; and communicating, using a second portion of the multiple transceiver units including the second transceiver unit, via a WLAN using a second MIMO configuration at the first time.

16. The method of claim 12, further comprising:

communicating, using a first portion of multiple transceiver units including the first transceiver unit, via a WWAN using a first multiple-input, multiple-output (MIMO) configuration at a first time; and communicating, using a second portion of the multiple transceiver units including the second transceiver unit, via a WLAN using a second MIMO configuration at the first time, the second MIMO configuration including at least one fewer antenna than the first MIMO configuration.

17. The method of claim 12, wherein the first transceiver unit is coupled to the band-rejection filter.

18. A method for operating a wireless communications apparatus that includes:

a switched extractor coupled to a first antenna, the switched extractor including:

an extractor having multiple filters, the extractor configured to extract an extraction frequency band using the multiple filters;

a bypass line that bypasses the extractor; and multiple transceiver units including a first transceiver unit configured to communicate via a wireless wide area network (WWAN) and a second transceiver unit configured to communicate via a wireless local area network (WLAN), the first transceiver unit coupled to the first antenna via the switched extractor, the second transceiver unit coupled to the first antenna via the switched extractor and coupled to a second antenna, the method comprising:

routing a first signal received via the first antenna to the first transceiver unit via the bypass line or via the extractor based on the extraction frequency band and an operational frequency band associated with the first transceiver unit;

communicating, using a first portion of the multiple transceiver units including the first transceiver unit, via the WWAN using a first multiple-input, multiple-output (MIMO) configuration at a first time when the first transceiver unit is connected to the first antenna via the extractor; and communicating, using a second portion of the multiple transceiver units including the second transceiver unit, via the WLAN using a second MIMO configuration at the first time.

19. The method of claim 18, further comprising:

connecting the first transceiver unit to the first antenna via the bypass line at a second time;

communicating, using the first portion of the multiple transceiver units, via the WWAN using the first MIMO configuration at the second time; and communicating, using at least part of the second portion of the multiple transceiver units, via the WLAN using a third MIMO configuration at the second time, the third MIMO configuration comprising at least one fewer antenna than the second MIMO configuration.

* * * * *